(12) United States Patent
Chen et al.

(10) Patent No.: US 8,169,528 B2
(45) Date of Patent: May 1, 2012

(54) PHOTOGRAPHING LENS ASSEMBLY

(75) Inventors: Chun Shan Chen, Taichung (TW);
Hsiang Chi Tang, Taichung (TW);
Tsung Han Tsai, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 243 days.

(21) Appl. No.: 12/775,905

(22) Filed: May 7, 2010

(65) Prior Publication Data
US 2011/0157449 A1 Jun. 30, 2011

(30) Foreign Application Priority Data
Dec. 24, 2009 (TW) .............................. 98144682 A

(51) Int. Cl.
*H04N 5/225* (2006.01)
(52) U.S. Cl. ........ 348/335; 348/360; 348/361; 348/362; 359/715
(58) Field of Classification Search .................. 348/335, 348/360–362; 359/715, 771, 772
See application file for complete search history.

(56) References Cited

U.S. PATENT DOCUMENTS

| | | | |
|---|---|---|---|
| 6,130,714 A * | 10/2000 | Abe et al. ....................... | 348/335 |
| 7,145,736 B2 | 12/2006 | Noda | |
| 7,365,920 B2 | 4/2008 | Noda | |
| 7,609,313 B2 * | 10/2009 | Yamaguchi et al. .......... | 348/335 |
| 7,688,523 B2 * | 3/2010 | Sano .............................. | 359/715 |
| 2004/0135917 A1 * | 7/2004 | Mihara ......................... | 348/335 |
| 2005/0253952 A1 * | 11/2005 | Minefuji ....................... | 348/335 |
| 2010/0020417 A1 * | 1/2010 | Lin ................................ | 359/715 |
| 2010/0097709 A1 * | 4/2010 | Tsai .............................. | 359/715 |
| 2010/0149404 A1 * | 6/2010 | Imamura et al. .............. | 348/335 |

* cited by examiner

*Primary Examiner* — Tuan Ho
*Assistant Examiner* — Kent Wang
(74) *Attorney, Agent, or Firm* — Morris Manning & Martin LLP; Tim Tingkang Xia, Esq.

(57) ABSTRACT

This invention provides a photographing lens assembly comprising, in order from an object side to an image side: a first lens element with positive refractive power having a convex object-side surface and a convex image-side surface; a second lens element with negative refractive power having a concave object-side surface and a concave image-side surface; a third lens element with negative refractive power, the object-side and image-side surfaces thereof being aspheric; a fourth lens element with negative refractive power having a concave image-side surface on which at least one inflection point is formed; and an aperture stop disposed between an imaged object and the second lens element; wherein there are four lens elements with refractive power. Such an arrangement of optical elements can effectively reduce the size of the lens assembly, attenuate the sensitivity of the optical system and enable the lens assembly to obtain higher resolution.

26 Claims, 34 Drawing Sheets

| TABLE 1 | | | | | | | |
|---|---|---|---|---|---|---|---|
| (Embodiment 1) | | | | | | | |
| f = 3.46 mm, Fno = 2.85, HFOV = 33.1 deg. | | | | | | | |
| Surface # | | Curvature Radius | Thickness | Material | Index | Abbe # | Focal length |
| 0 | Object | Plano | Infinity | | | | |
| 1 | Ape. Stop | Plano | -0.126 | | | | |
| 2 | Lens 1 | 1.32494 (ASP) | 0.550 | Plastic | 1.544 | 55.9 | 2.21 |
| 3 | | -11.01120 (ASP) | 0.069 | | | | |
| 4 | Lens 2 | -17.78850 (ASP) | 0.491 | Plastic | 1.632 | 23.4 | -3.78 |
| 5 | | 2.78543 (ASP) | 0.478 | | | | |
| 6 | Lens 3 | -2.89966 (ASP) | 0.522 | Plastic | 1.544 | 55.9 | -276.97 |
| 7 | | -3.14410 (ASP) | 0.050 | | | | |
| 8 | Lens 4 | 1.45255 (ASP) | 0.657 | Plastic | 1.530 | 55.8 | -92.69 |
| 9 | | 1.18979 (ASP) | 0.400 | | | | |
| 10 | IR-filter | Plano | 0.300 | Glass | 1.517 | 64.2 | - |
| 11 | | Plano | 0.495 | | | | |
| 12 | Image | Plano | | | | | |

Fig.9

| TABLE 2 | | | | |
|---|---|---|---|---|
| Aspheric Coefficients | | | | |
| Surface # | 2 | 3 | 4 | 5 |
| k = | -9.71028E-01 | 0.00000E+00 | -1.00000E+00 | 1.59550E+00 |
| A4 = | 4.86071E-02 | 2.41646E-02 | 3.46175E-02 | 1.09564E-01 |
| A6 = | -1.73593E-01 | -8.56292E-01 | -7.87365E-01 | -3.34719E-01 |
| A8 = | 8.60036E-01 | 3.46173E+00 | 3.39940E+00 | 1.06515E+00 |
| A10= | -1.45623E+00 | -5.05661E+00 | -4.73715E+00 | -1.10036E+00 |
| A12= | | | | 4.15705E-01 |
| Surface # | 6 | 7 | 8 | 9 |
| k = | -9.34645E+01 | 5.11337E+00 | -1.13840E+01 | -5.26154E+00 |
| A4 = | -6.45697E-02 | -1.86963E-01 | -3.61962E-01 | -1.79725E-01 |
| A6 = | 4.43674E-02 | 2.99801E-01 | 1.91258E-01 | 8.03241E-02 |
| A8 = | -3.20964E-01 | -2.25813E-01 | -3.77715E-02 | -2.94048E-02 |
| A10= | 2.65779E-01 | 7.50206E-02 | 1.99641E-03 | 5.92340E-03 |
| A12= | -1.56191E-01 | | | -5.44852E-04 |

Fig.10

| TABLE 3 | | | | | | |
|---|---|---|---|---|---|---|
| (Embodiment 2) | | | | | | |
| f = 3.85 mm, Fno = 2.85, HFOV= 30.4 deg. | | | | | | |
| Surface # | | Curvature Radius | Thickness | Material | Index | Abbe # | Focal length |
| 0 | Object | Plano | Infinity | | | | |
| 1 | Ape. Stop | Plano | -0.124 | | | | |
| 2 | Lens 1 | 1.45536 (ASP) | 0.573 | Plastic | 1.544 | 55.9 | 2.16 |
| 3 | | -5.28240 (ASP) | 0.070 | | | | |
| 4 | Lens 2 | -13.79230 (ASP) | 0.300 | Plastic | 1.632 | 23.4 | -4.08 |
| 5 | | 3.19810 (ASP) | 0.702 | | | | |
| 6 | Lens 3 | -0.91642 (ASP) | 0.456 | Plastic | 1.544 | 55.9 | -123.69 |
| 7 | | -1.09198 (ASP) | 0.070 | | | | |
| 8 | Lens 4 | 1.51675 (ASP) | 0.529 | Plastic | 1.544 | 55.9 | -126.26 |
| 9 | | 1.30160 (ASP) | 0.250 | | | | |
| 10 | IR-filter | Plano | 0.300 | Glass | 1.517 | 64.2 | - |
| 11 | | Plano | 0.100 | | | | |
| 12 | Cover-glass | Plano | 0.400 | Glass | 1.517 | 64.2 | - |
| 13 | | Plano | 0.752 | | | | |
| 14 | Image | Plano | | | | | |

Fig.11

| TABLE 4A | | | | | | |
|---|---|---|---|---|---|---|
| Aspheric Coefficients | | | | | | |
| Surface # | 2 | 3 | 4 | 5 | 6 | 7 |
| k = | -7.80336E-01 | 0.00000E+00 | 0.00000E+00 | 3.44911E+00 | -4.63527E+00 | -1.51744E+00 |
| A4 = | -4.62989E-03 | -1.30857E-01 | 1.28975E-02 | 1.11948E-01 | -4.38216E-01 | -2.74483E-01 |
| A6 = | -1.27500E-01 | 6.21531E-02 | 9.50089E-02 | -2.01578E-02 | 3.80985E-01 | 5.17770E-01 |
| A8 = | 1.52255E-01 | -9.16150E-01 | -6.89319E-01 | 9.14407E-02 | -1.12999E+00 | -7.10581E-01 |
| A10= | -4.70202E-01 | 1.93983E+00 | 1.76744E+00 | -1.10098E-01 | 2.70295E+00 | 5.57533E-01 |
| A12= | | -1.53956E+00 | -1.06523E+00 | 2.08314E-01 | -3.54718E+00 | 7.77577E-02 |
| A14= | | | -1.97383E-01 | | 2.45845E+00 | -3.56505E-01 |
| A16= | | | | | -1.27874E+00 | 1.47101E-01 |

Fig.12A

| TABLE 4B | | |
|---|---|---|
| Aspheric Coefficients | | |
| Surface # | 8 | 9 |
| k = | -1.13981E+01 | -5.04194E+00 |
| A1 = | | |
| A2 = | | |
| A3 = | | |
| A4 = | -2.30226E-01 | -2.12884E-01 |
| A5 = | | |
| A6 = | 1.57494E-01 | 1.24311E-01 |
| A7 = | | |
| A8 = | -5.45144E-02 | -5.14975E-02 |
| A9 = | | |
| A10= | 2.59019E-03 | 9.97861E-03 |
| A11= | | |
| A12= | 9.97553E-04 | 5.17727E-05 |
| A13= | | |
| A14= | 5.43191E-04 | -4.34965E-04 |
| A15= | | |
| A16= | -1.20409E-04 | 5.48222E-05 |

Fig.12B

| TABLE 5 | | | | | | | |
|---|---|---|---|---|---|---|---|
| (Embodiment 3) | | | | | | | |
| f = 4.27 mm, Fno = 2.48, HFOV= 33.5 deg. | | | | | | | |
| Surface # | | Curvature Radius | Thickness | Material | Index | Abbe # | Focal length |
| 0 | Object | Plano | Infinity | | | | |
| 1 | Ape. Stop | Plano | -0.297 | | | | |
| 2 | Lens 1 | 1.26562 (ASP) | 0.706 | Plastic | 1.544 | 55.9 | 2.36 |
| 3 | | 78.08770 (ASP) | 0.050 | | | | |
| 4 | Lens 2 | -6.52340 (ASP) | 0.300 | Plastic | 1.632 | 23.4 | -4.92 |
| 5 | | 6.05330 (ASP) | 0.211 | | | | |
| 6 | | Plano | 0.432 | | | | |
| 7 | Lens 3 | -1.43091 (ASP) | 0.751 | Plastic | 1.544 | 55.9 | -166.00 |
| 8 | | -1.72285 (ASP) | 0.114 | | | | |
| 9 | Lens 4 | 1.93087 (ASP) | 0.556 | Plastic | 1.544 | 55.9 | -20.72 |
| 10 | | 1.48131 (ASP) | 0.600 | | | | |
| 11 | IR-filter | Plano | 0.300 | Glass | 1.517 | 64.2 | - |
| 12 | | Plano | 0.701 | | | | |
| 13 | Image | Plano | | | | | |
| Note: The effective diameter of surface #6 is 1.600mm | | | | | | | |

Fig.13

| TABLE 6A | | | | | | |
|---|---|---|---|---|---|---|
| Aspheric Coefficients | | | | | | |
| Surface # | 2 | 3 | 4 | 5 | 7 | 8 |
| k = | -5.74000E-01 | -1.00000E+00 | -1.00000E+00 | 1.02496E+01 | -1.23714E+01 | 4.57426E-01 |
| A4 = | 1.33215E-02 | -6.90866E-02 | 5.20203E-02 | 1.56738E-01 | -4.25897E-01 | -1.69091E-01 |
| A6 = | 1.21237E-01 | -5.23554E-02 | -3.17563E-02 | 1.73903E-01 | 3.23490E-01 | 2.50903E-01 |
| A8 = | -2.16570E-01 | -1.74006E-01 | -1.35986E-01 | -2.40928E-01 | -3.78614E-01 | -2.09538E-01 |
| A10= | -6.34328E-02 | 2.71516E-01 | 2.05683E-01 | 1.50479E-01 | -1.23288E-01 | 6.87799E-02 |
| A12= | 3.54709E-01 | -2.18944E-01 | 7.13864E-02 | 5.51210E-01 | 9.29774E-02 | 2.58766E-02 |
| A14= | 1.68752E-01 | -1.53569E-01 | -5.49044E-01 | -2.63920E-03 | 6.43039E-01 | -1.65070E-02 |
| A16= | -5.61636E-01 | 1.37663E-01 | 3.16202E-01 | -3.84579E-01 | -6.67727E-01 | 1.65025E-03 |

Fig.14A

| TABLE 6B | | |
|---|---|---|
| Aspheric Coefficients | | |
| Surface # | 9 | 10 |
| k = | -2.05397E+01 | -6.87321E+00 |
| A1 = | | |
| A2 = | | |
| A3 = | | |
| A4 = | -1.89344E-01 | -1.21635E-01 |
| A5 = | | |
| A6 = | 7.62489E-02 | 4.25094E-02 |
| A7 = | | |
| A8 = | -1.24760E-02 | -1.07259E-02 |
| A9 = | | |
| A10= | 4.69240E-04 | 1.23844E-03 |
| A11= | | |
| A12= | 1.70275E-04 | 3.23967E-05 |
| A13= | | |
| A14= | -4.64832E-05 | -2.32772E-05 |
| A15= | | |
| A16= | 4.82327E-06 | 1.66602E-06 |

Fig.14B

| TABLE 7 | | | | | | |
|---|---|---|---|---|---|---|
| (Embodiment 4) | | | | | | |
| f = 3.08 mm, Fno = 2.40, HFOV = 30.1 deg. | | | | | | |
| Surface # | | Curvature Radius | Thickness | Material | Index | Abbe # | Focal length |
| 0 | Object | Plano | Infinity | | | | |
| 1 | Ape. Stop | Plano | -0.118 | | | | |
| 2 | Lens 1 | 1.44258 (ASP) | 0.715 | Plastic | 1.544 | 55.9 | 1.76 |
| 3 | | -2.37038 (ASP) | 0.045 | | | | |
| 4 | Lens 2 | -3.65810 (ASP) | 0.300 | Plastic | 1.632 | 23.4 | -3.19 |
| 5 | | 4.62830 (ASP) | 0.494 | | | | |
| 6 | Lens 3 | -0.88281 (ASP) | 0.385 | Plastic | 1.544 | 55.9 | -99.06 |
| 7 | | -1.03544 (ASP) | 0.050 | | | | |
| 8 | Lens 4 | 1.75843 (ASP) | 0.804 | Plastic | 1.544 | 55.9 | -41.47 |
| 9 | | 1.36848 (ASP) | 0.200 | | | | |
| 10 | IR-filter | Plano | 0.300 | Glass | 1.517 | 64.2 | - |
| 11 | | Plano | 0.563 | | | | |
| 12 | Image | Plano | | | | | |

Fig.15

| TABLE 8 | | | | |
|---|---|---|---|---|
| Aspheric Coefficients | | | | |
| Surface # | 2 | 3 | 4 | 5 |
| k = | -2.08248E+00 | -2.36793E+01 | -9.21499E+01 | 1.82150E+01 |
| A4 = | 5.67289E-02 | 1.50146E-01 | 2.97283E-01 | 2.39325E-01 |
| A6 = | -1.10415E-01 | -2.41095E+00 | -2.64021E+00 | -1.07369E+00 |
| A8 = | 1.88658E-01 | 6.54162E+00 | 7.16269E+00 | 2.48502E+00 |
| A10= | -5.53326E-01 | -9.24346E+00 | -1.00443E+01 | -3.60541E+00 |
| A12= | | 5.19510E+00 | 6.14758E+00 | 2.22623E+00 |
| Surface # | 6 | 7 | 8 | 9 |
| k = | -6.20543E+00 | 5.61254E-02 | -2.22293E+01 | -4.61968E+00 |
| A4 = | -4.57685E-01 | -2.29901E-01 | -4.08368E-01 | -2.55552E-01 |
| A6 = | 3.72821E-02 | 6.53665E-01 | 3.89605E-01 | 1.79713E-01 |
| A8 = | 9.49298E-03 | -6.51107E-01 | -1.59977E-01 | -9.80947E-02 |
| A10= | 9.27298E-01 | 7.14558E-01 | -3.31788E-02 | 3.09115E-02 |
| A12= | -1.58455E+00 | | 3.07646E-02 | -5.62915E-03 |
| A14= | 1.07025E+00 | | | 3.98673E-04 |

Fig.16

| TABLE 9 | | | | | | |
|---|---|---|---|---|---|---|
| (Embodiment 5) | | | | | | |
| f = 3.90 mm, Fno = 2.85, HFOV= 30.2 deg. | | | | | | |
| Surface # | | Curvature Radius | Thickness | Material | Index | Abbe # | Focal length |
| 0 | Object | Plano | Infinity | | | | |
| 1 | Ape. Stop | Plano | -0.217 | | | | |
| 2 | Lens 1 | 1.14412 (ASP) | 0.565 | Plastic | 1.544 | 55.9 | 2.18 |
| 3 | | 25.50240 (ASP) | 0.062 | | | | |
| 4 | Lens 2 | -100.00000 (ASP) | 0.300 | Plastic | 1.632 | 23.4 | -3.94 |
| 5 | | 2.55530 (ASP) | 0.721 | | | | |
| 6 | Lens 3 | -1.38001 (ASP) | 0.487 | Plastic | 1.544 | 55.9 | -128.16 |
| 7 | | -1.58295 (ASP) | 0.200 | | | | |
| 8 | Lens 4 | 1.41729 (ASP) | 0.436 | Plastic | 1.544 | 55.9 | -23.94 |
| 9 | | 1.13966 (ASP) | 0.250 | | | | |
| 10 | IR-filter | Plano | 0.300 | Glass | 1.517 | 64.2 | - |
| 11 | | Plano | 0.100 | | | | |
| 12 | Cover-glass | Plano | 0.400 | Glass | 1.517 | 64.2 | - |
| 13 | | Plano | 0.449 | | | | |
| 14 | Image | Plano | | | | | |

Fig.17

| TABLE 10A | | | | | | |
|---|---|---|---|---|---|---|
| Aspheric Coefficients | | | | | | |
| Surface # | 2 | 3 | 4 | 5 | 6 | 7 |
| k = | -5.60057E-01 | 0.00000E+00 | 0.00000E+00 | 2.67018E+00 | -1.54822E+01 | 8.51637E-01 |
| A4 = | 6.03429E-02 | -8.86588E-02 | -7.72362E-02 | 7.12990E-02 | -7.12881E-01 | -3.31557E-01 |
| A6 = | -3.96285E-02 | 1.60282E-01 | 1.39918E-01 | 1.35935E-01 | 9.74414E-01 | 5.71938E-01 |
| A8 = | 2.32714E-01 | -1.06725E+00 | -3.55328E-01 | 1.34067E-01 | -2.74494E+00 | -7.48037E-01 |
| A10= | -2.61159E-01 | 3.64226E+00 | 6.25855E-01 | -9.86369E-02 | 3.73037E+00 | 4.24076E-01 |
| A12= | | -4.56415E+00 | 1.90082E+00 | 8.50901E-01 | -1.89977E+00 | 1.55274E-01 |
| A14= | | | -5.32131E+00 | | -1.11766E+00 | -1.71174E-01 |
| A16= | | | | | 1.37065E+00 | 2.95562E-02 |

Fig.18A

| TABLE 10B | | |
|---|---|---|
| Aspheric Coefficients | | |
| Surface # | 8 | 9 |
| k = | -1.44068E+01 | -6.97826E+00 |
| A1 = | | |
| A2 = | | |
| A3 = | | |
| A4 = | -3.35352E-01 | -2.03709E-01 |
| A5 = | | |
| A6 = | 2.09392E-01 | 1.08480E-01 |
| A7 = | | |
| A8 = | -5.14407E-02 | -4.33018E-02 |
| A9 = | | |
| A10= | 1.86258E-03 | 9.01597E-03 |
| A11= | | |
| A12= | 4.55616E-04 | -2.53856E-05 |
| A13= | | |
| A14= | 3.41129E-04 | -3.75731E-04 |
| A15= | | |
| A16= | -7.70021E-05 | 5.21943E-05 |

Fig.18B

| TABLE 11 | | | | | | |
|---|---|---|---|---|---|---|
| (Embodiment 6) | | | | | | |
| f = 4.94 mm, Fno = 2.45, HFOV = 30.0 deg. | | | | | | |
| Surface # | | Curvature Radius | Thickness | Material | Index | Abbe # | Focal length |
| 0 | Object | Plano | Infinity | | | | |
| 1 | Ape. Stop | Plano | -0.061 | | | | |
| 2 | Lens 1 | 2.40052 (ASP) | 0.803 | Plastic | 1.544 | 55.9 | 3.23 |
| 3 | | -5.79360 (ASP) | 0.060 | | | | |
| 4 | Lens 2 | -19.63560 (ASP) | 0.339 | Plastic | 1.632 | 23.4 | -6.40 |
| 5 | | 5.13290 (ASP) | 1.378 | | | | |
| 6 | Lens 3 | -1.58164 (ASP) | 0.406 | Plastic | 1.544 | 55.9 | -398.32 |
| 7 | | -1.73739 (ASP) | 0.050 | | | | |
| 8 | Lens 4 | 1.91474 (ASP) | 1.036 | Plastic | 1.530 | 55.8 | -375.37 |
| 9 | | 1.54105 (ASP) | 0.500 | | | | |
| 10 | IR-filter | Plano | 0.300 | Glass | 1.517 | 64.2 | - |
| 11 | | Plano | 0.300 | | | | |
| 12 | Cover-glass | Plano | 0.400 | Glass | 1.517 | 64.2 | - |
| 13 | | Plano | 0.365 | | | | |
| 14 | Image | Plano | | | | | |

Fig.19

| TABLE 12 | | | | |
|---|---|---|---|---|
| Aspheric Coefficients | | | | |
| Surface # | 2 | 3 | 4 | 5 |
| k = | -6.71748E-01 | -1.39343E+01 | -1.59680E+02 | -2.11969E+01 |
| A4 = | -3.32455E-03 | -5.68410E-03 | -1.02608E-03 | 1.34859E-02 |
| A6 = | -7.36672E-03 | -5.83423E-02 | -6.53604E-02 | -3.37136E-02 |
| A8 = | 5.87731E-03 | 2.68162E-02 | 2.82721E-02 | 9.84088E-03 |
| A10= | -1.05155E-02 | -7.57211E-03 | 1.61227E-03 | |
| Surface # | 6 | 7 | 8 | 9 |
| k = | -1.19508E+01 | 1.26680E-01 | -1.49634E+01 | -5.58066E+00 |
| A4 = | -4.28877E-02 | 1.75967E-02 | -9.65876E-02 | -5.31229E-02 |
| A6 = | -4.48249E-02 | -4.65585E-03 | 2.11239E-02 | 1.19402E-02 |
| A8 = | 1.41606E-02 | -1.27195E-03 | 7.42208E-04 | -2.09974E-03 |
| A10= | -7.47143E-03 | -1.12479E-04 | -8.90991E-04 | 1.20330E-04 |
| A12= | 4.61211E-03 | 1.78609E-03 | -1.65151E-05 | 1.52637E-05 |
| A14= | -2.53782E-03 | 7.03093E-04 | 3.20266E-05 | -2.61579E-06 |
| A16= | 8.92354E-04 | -2.12752E-04 | -2.59250E-06 | 6.83118E-08 |

Fig.20

| TABLE 13 | | | | | | |
|---|---|---|---|---|---|---|
| (Embodiment 7) | | | | | | |
| f = 4.56 mm, Fno = 2.85, HFOV= 31.8 deg. | | | | | | |
| Surface # | | Curvature Radius | Thickness | Material | Index | Abbe # | Focal length |
| 0 | Object | Plano | Infinity | | | | |
| 1 | Ape. Stop | Plano | -0.236 | | | | |
| 2 | Lens 1 | 1.29527 (ASP) | 0.583 | Plastic | 1.544 | 55.9 | 3.51 |
| 3 | | 3.39340 (ASP) | 0.050 | | | | |
| 4 | Lens 2 | 9.97420 (ASP) | 0.300 | Plastic | 1.632 | 23.4 | -24.10 |
| 5 | | 5.95690 (ASP) | 0.816 | | | | |
| 6 | Lens 3 | -0.93962 (ASP) | 0.494 | Plastic | 1.544 | 55.9 | -89.51 |
| 7 | | -1.13561 (ASP) | 0.394 | | | | |
| 8 | Lens 4 | 2.07341 (ASP) | 0.522 | Plastic | 1.544 | 55.9 | -32.64 |
| 9 | | 1.69195 (ASP) | 1.000 | | | | |
| 10 | IR-filter | Plano | 0.300 | Glass | 1.517 | 64.2 | - |
| 11 | | Plano | 0.512 | | | | |
| 12 | Image | Plano | | | | | |

Fig.21

| TABLE 14 | | | | |
|---|---|---|---|---|
| Aspheric Coefficients | | | | |
| Surface # | 2 | 3 | 4 | 5 |
| k = | -6.13800E-01 | -1.00000E+00 | -1.00000E+00 | -5.57933E+01 |
| A4 = | 1.05550E-02 | -3.65209E-01 | -2.73895E-01 | 1.10773E-01 |
| A6 = | 2.52179E-02 | -8.80419E-02 | 2.08807E-01 | 2.79202E-01 |
| A8 = | 9.69944E-03 | 5.77693E-01 | 2.95910E-01 | 1.98161E-02 |
| A10= | -2.74855E-01 | -3.63898E-01 | -5.22255E-02 | -1.94610E-01 |
| A12= | 1.92449E-01 | -1.98551E-01 | -1.79860E-01 | 4.08078E-01 |
| A14= | 1.38137E-01 | -9.43648E-02 | -5.27306E-01 | 1.44380E-02 |
| A16= | -3.34711E-01 | 1.98731E-01 | 6.02797E-01 | -2.11255E-01 |
| Surface # | 6 | 7 | 8 | 9 |
| k = | -5.67991E+00 | -6.02696E-01 | -2.00802E+01 | -1.08566E+01 |
| A4 = | -7.18733E-01 | -1.15331E-01 | -1.07135E-01 | -7.87203E-02 |
| A6 = | 6.56971E-01 | 1.33027E-01 | 5.11762E-02 | 2.30950E-02 |
| A8 = | -4.98080E-01 | -1.27070E-01 | -1.24029E-02 | -4.80813E-03 |
| A10= | 1.08591E-01 | 1.19313E-01 | 8.19874E-04 | 4.52282E-04 |
| A12= | 1.30741E-01 | -2.37086E-03 | 2.12720E-04 | -1.17796E-05 |
| A14= | 1.72701E-01 | -3.95089E-02 | -5.79298E-05 | -2.58893E-06 |
| A16= | -3.37540E-01 | 1.17186E-02 | 5.26011E-06 | -5.29162E-08 |

Fig.22

| TABLE 15 | | | | | | |
|---|---|---|---|---|---|---|
| (Embodiment 8) | | | | | | |
| f = 3.44 mm, Fno = 2.85, HFOV = 33.3 deg. | | | | | | |
| Surface # | | Curvature Radius | Thickness | Material | Index | Abbe # | Focal length |
| 0 | Object | Plano | Infinity | | | | |
| 1 | Ape. Stop | Plano | -0.140 | | | | |
| 2 | Lens 1 | 1.20682 (ASP) | 0.494 | Plastic | 1.544 | 55.9 | 2.00 |
| 3 | | -9.26370 (ASP) | 0.050 | | | | |
| 4 | Lens 2 | 17.83220 (ASP) | 0.318 | Plastic | 1.632 | 23.4 | -3.26 |
| 5 | | 1.83379 (ASP) | 0.538 | | | | |
| 6 | Lens 3 | -1.85717 (ASP) | 0.480 | Plastic | 1.544 | 55.9 | -278.60 |
| 7 | | -2.05145 (ASP) | 0.371 | | | | |
| 8 | Lens 4 | 1.20793 (ASP) | 0.494 | Plastic | 1.530 | 55.8 | -74.94 |
| 9 | | 1.00621 (ASP) | 0.280 | | | | |
| 10 | IR-filter | Plano | 0.300 | Glass | 1.517 | 64.2 | - |
| 11 | | Plano | 0.100 | | | | |
| 12 | Cover-glass | Plano | 0.400 | Glass | 1.517 | 64.2 | - |
| 13 | | Plano | 0.194 | | | | |
| 14 | Image | Plano | | | | | |

Fig.23

| TABLE 16A | | | | |
|---|---|---|---|---|
| Aspheric Coefficients | | | | |
| Surface # | 2 | 3 | 4 | 5 |
| k    = | -2.04250E-01 | 1.16957E+02 | -5.83002E+01 | -1.29984E+01 |
| A4 = | 1.15705E-02 | -6.02246E-03 | -8.02198E-03 | 3.13941E-01 |
| A6 = | -1.38173E-01 | -1.46049E-01 | -2.44076E-02 | -2.06628E-01 |
| A8 = | 4.17164E-01 | -1.07885E-01 | -9.91002E-02 | 4.30841E-01 |
| A10= | -9.88268E-01 | -4.11429E-01 | -2.59138E-01 | |
| A12= | | | 3.60009E-01 | |
| Surface # | 6 | 7 | 9 | |
| k    = | 4.86277E+00 | 9.22606E-01 | -5.14978E+00 | |
| A4 = | -1.52940E-01 | -4.31872E-01 | -1.63202E-01 | |
| A6 = | -1.91973E-02 | 5.71489E-01 | 7.30288E-02 | |
| A8 = | -1.37964E-01 | -5.63745E-01 | -2.60021E-02 | |
| A10= | 2.74716E-01 | 1.34310E-02 | 4.88530E-03 | |
| A12= | -1.22722E+00 | 3.04145E-01 | -3.61374E-04 | |
| A14= | 4.88039E+00 | 1.30132E-01 | 4.06325E-05 | |
| A16= | -3.50505E+00 | -2.03694E-01 | -1.22453E-05 | |

Fig.24A

| TABLE 16B |  |
|---|---|
| Aspheric Coefficients | |
| Surface # | 8 |
| k = | -8.01159E+00 |
| A1 = | |
| A2 = | |
| A3 = | |
| A4 = | -2.96488E-01 |
| A5 = | |
| A6 = | 1.51413E-01 |
| A7 = | |
| A8 = | -3.27465E-02 |
| A9 = | |
| A10= | 4.78492E-03 |
| A11= | |
| A12= | -1.27293E-03 |
| A13= | |
| A14= | 1.84207E-04 |
| A15= | |
| A16= | -2.06636E-06 |

Fig.24B

TABLE 17

| | Embodiment 1 | Embodiment 2 | Embodiment 3 | Embodiment 4 | Embodiment 5 | Embodiment 6 | Embodiment 7 | Embodiment 8 |
|---|---|---|---|---|---|---|---|---|
| f | 3.46 | 3.85 | 4.27 | 3.08 | 3.90 | 4.94 | 4.56 | 3.44 |
| Fno | 2.85 | 2.85 | 2.48 | 2.40 | 2.85 | 2.45 | 2.85 | 2.85 |
| HFOV | 33.1 | 30.4 | 33.5 | 30.1 | 30.2 | 30.0 | 31.8 | 33.3 |
| V1−V2 | 32.5 | 32.5 | 32.5 | 32.5 | 32.5 | 32.5 | 32.5 | 32.5 |
| |V1−V3| | 0.0 | 0.0 | 0.0 | 0.0 | 0.0 | 0.0 | 0.0 | 0.0 |
| N2 | 1.632 | 1.632 | 1.632 | 1.632 | 1.632 | 1.632 | 1.632 | 1.632 |
| CT2 [mm] | 0.491 | 0.300 | 0.300 | 0.300 | 0.300 | 0.339 | 0.300 | 0.318 |
| (T12/f)*100 | 1.99 | 1.82 | 1.17 | 1.46 | 1.59 | 1.21 | 1.10 | 1.45 |
| (T34+CT4)/f | 0.20 | 0.16 | 0.16 | 0.28 | 0.16 | 0.22 | 0.20 | 0.25 |
| R1/f | 0.38 | 0.38 | 0.30 | 0.47 | 0.29 | 0.49 | 0.28 | 0.35 |
| R4/f | 0.81 | 0.83 | 1.42 | 1.50 | 0.66 | 1.04 | 1.31 | 0.53 |
| R5/R6 | 0.92 | 0.84 | 0.83 | 0.85 | 0.87 | 0.91 | 0.83 | 0.91 |
| R7/R8 | 1.22 | 1.17 | 1.30 | 1.28 | 1.24 | 1.24 | 1.23 | 1.20 |
| f/f1 | 1.57 | 1.78 | 1.81 | 1.75 | 1.79 | 1.53 | 1.30 | 1.72 |
| (f/f3)*100 | −1.25 | −3.11 | −2.57 | −3.11 | −3.04 | −1.24 | −5.09 | −1.23 |
| TTL/ImgH | 1.74 | 1.88 | 1.62 | 2.10 | 1.78 | 2.00 | 1.72 | 1.67 |

Fig. 25

PHOTOGRAPHING LENS ASSEMBLY

BACKGROUND OF THE INVENTION

1. Field of the Invention

The present invention relates to a photographing lens assembly applicable to mobile phone cameras or digital cameras, and more particularly, to a compact photographing lens assembly used in a mobile phone camera.

2. Description of the Prior Art

In recent years, with the popularity of mobile phone cameras, the demand for compact imaging lenses is increasing, and the sensor of a general photographing camera is none other than CCD (charge coupled device) or CMOS Sensor (Complementary Metal Oxide Semiconductor Sensor). Furthermore, as advanced semiconductor manufacturing technology has allowed the pixel size of sensors to be reduced and electronic products have become more compact and powerful, there is an increasing demand for compact imaging lenses featuring better image quality.

Generally, a conventional lens assembly for mobile phone cameras, such as the one disclosed in U.S. Pat. No. 7,145,736, is of a triplet type comprising, in order from the object side to the image side: a first lens element with positive refractive power; a second lens element with negative refractive power; and a third lens element with positive refractive power. However, the three-element lens assembly has become insufficient for a high-end imaging lens module due to the reduction in the pixel size of sensors and the increasing demand for lens assemblies featuring better image quality.

U.S. Pat. No. 7,365,920 has disclosed a four lens element assembly where the first and second lens elements are adhered by means of two glass spherical-surface lenses to form a doublet and thereby to correct the chromatic aberration. Such an arrangement of optical elements, however, has the following disadvantages: (1) the freedom of the system is curtailed due to the employment of excess number of glass spherical-surface lenses, thus the total track length of the system cannot be reduced easily; (2) the process of adhering the glass lenses together is complicated, posing difficulties in manufacture.

SUMMARY OF THE INVENTION

In order to solve the aforementioned problems, the present invention provides a photographing lens assembly comprising, in order from an object side to an image side: a first lens element with positive refractive power having a convex object-side surface and a convex image-side surface; a second lens element with negative refractive power having a concave object-side surface and a concave image-side surface; a third lens element with negative refractive power, the object-side and image-side surfaces thereof being aspheric; a fourth lens element with negative refractive power having a concave image-side surface on which at least one inflection point is formed; and an aperture stop disposed between an imaged object and the second lens element; wherein there are four lens elements with refractive power; and wherein a distance near the optical axis between the first and second lens elements is T12, the focal length of the photographing lens assembly is f, the Abbe number of the first lens element is V1, the Abbe number of the second lens element is V2, the focal length of the third lens element is f3, and they satisfy the relations: $0.50<(T12/f)*100<10.00$, $30.5<V1-V2<42.0$, $-60.0<(f/f3)*100<-0.5$.

The present invention provides another photographing lens assembly comprising, in order from the object side to the image side: a first lens element with positive refractive power having a convex object-side surface; a second lens element with negative refractive power; a third lens element with negative refractive power having a concave object-side surface and a convex image-side surface, the object-side and image-side surfaces thereof being aspheric; a fourth lens element with negative refractive power having a concave image-side surface on which at least one inflection point is formed; and an aperture stop disposed between an imaged object and the second lens element; wherein a distance near the optical axis between the first and second lens elements is T12, the focal length of the photographing lens assembly is f, the Abbe number of the first lens element is V1, the Abbe number of the third lens element is V3, the refractive index of the second lens element is N2, a distance near the optical axis between the third and fourth lens elements is T34, the thickness of the fourth lens element near the optical axis is CT4, and they satisfy the relations: $0.50<(T12/f)*100<10.00$, $|V1-V3|<15.0$, $1.50<N2<1.66$, $0.05<(T34+CT4)/f<0.25$.

The aforementioned arrangement of optical elements can effectively reduce the size of the lens assembly, attenuate the sensitivity of the optical system and enable the lens assembly to obtain higher resolution.

In the present photographing lens assembly, the first lens element with positive refractive power provides the majority of the refractive power of the system; the second lens element has negative refractive power so as to favorably correct the chromatic aberration of the system; the third and fourth lens elements function as correction lenses to balance and correct various kinds of aberration of the system. When the third and fourth lens elements both have negative refractive power, the principal point of the optical system can be positioned far away from the image plane, thereby the total track length of the system can be favorably reduced to keep the photographing lens assembly compact.

In the present photographing lens assembly, the first lens element may be a bi-convex lens element or a meniscus lens element having a convex object-side surface and a concave image-side surface. When the first lens element is a bi-convex lens element, the refractive power thereof can be effectively enhanced, thus allowing a shortening of the total track length of the photographing lens assembly. When the first lens element is a meniscus lens element, the astigmatism of the system can be corrected more favorably. The second lens element may have a concave image-side surface so that the back focal length of the system can be favorably extended, thereby providing sufficient space to accommodate other components. When the object-side and image-side surfaces of the second lens element are both concave, the Petzval Sum of the system can be corrected more favorably and the back focal length of the system can be extended as well. The third lens element may have a concave object-side surface and a convex image-side surface so as to favorably correct the astigmatism of the system. The fourth lens element may be a meniscus lens element having a convex object-side surface and a concave image-side surface or a bi-concave lens element. When the fourth lens element is a meniscus lens element, the astigmatism and high order aberrations of the system can be corrected more favorably. When the fourth lens element is a bi-concave lens element, the principal point of the optical system can be positioned even farther away from the image plane, thereby the total track length of the system can be effectively reduced to keep the photographing lens assembly compact.

In the present photographing lens assembly, the aperture stop can be disposed between an imaged object and the first lens element or between the first and second lens elements.

The first lens element provides positive refractive power, and the aperture stop is disposed near the object side of the photographing lens assembly, thereby the total track length of the photographing lens assembly can be reduced effectively. The aforementioned arrangement also enables the exit pupil of the photographing lens assembly to be positioned far away from the image plane, thus light will be projected onto the electronic sensor at a nearly perpendicular angle, and this is the telecentric feature of the image side. The telecentric feature is very important to the photosensitive power of the solid-state sensor as it can improve the photosensitivity of the sensor to reduce the probability of the occurrence of shading. Moreover, the fourth lens element is provided with at least one inflection point, thereby the angle at which the light is projected onto the sensor from the off-axis field can be effectively reduced to further correct the off-axis aberrations. For an optical system with a wide field of view, it requires special effort to correct the distortion and chromatic aberration of magnification, and the correction can be made by placing the aperture stop in a location where the refractive power of the system is balanced. Such an aperture stop placement also helps to attenuate the sensitivity of the system. In the present photographing lens assembly, when the aperture stop is disposed near the imaged object, the telecentric feature is emphasized and this enables a shorter total track length. When the aperture stop is disposed near the second lens element, the emphasis is on the wide field of view so that the sensitivity of the system can be effectively attenuated.

BRIEF DESCRIPTION OF THE DRAWINGS

FIG. 9 is TABLE 1 which lists the optical data of the first embodiment.

FIG. 10 is TABLE 2 which lists the aspheric surface data of the first embodiment.

FIG. 11 is TABLE 3 which lists the optical data of the second embodiment.

FIGS. 12A and 12B are TABLES 4A and 4B which list the aspheric surface data of the second embodiment.

FIG. 13 is TABLE 5 which lists the optical data of the third embodiment.

FIGS. 14A and 14B are TABLES 6A and 6B which list the aspheric surface data of the third embodiment.

FIG. 15 is TABLE 7 which lists the optical data of the fourth embodiment.

FIG. 16 is TABLE 8 which lists the aspheric surface data of the fourth embodiment.

FIG. 17 is TABLE 9 which lists the optical data of the fifth embodiment.

FIGS. 18A and 18B are TABLES 10A and 10B which list the aspheric surface data of the fifth embodiment.

FIG. 19 is TABLE 11 which lists the optical data of the sixth embodiment.

FIG. 20 is TABLE 12 which lists the aspheric surface data of the sixth embodiment.

FIG. 21 is TABLE 13 which lists the optical data of the seventh embodiment.

FIG. 22 is TABLE 14 which lists the aspheric surface data of the seventh embodiment.

FIG. 23 is TABLE 15 which lists the optical data of the eighth embodiment.

FIGS. 24A and 24B are TABLES 16A and 16B which list the aspheric surface data of the eighth embodiment.

FIG. 25 is TABLE 17 which lists the data of the respective embodiments resulting from the equations.

DETAILED DESCRIPTION OF THE PREFERRED EMBODIMENTS

Figure 1A:
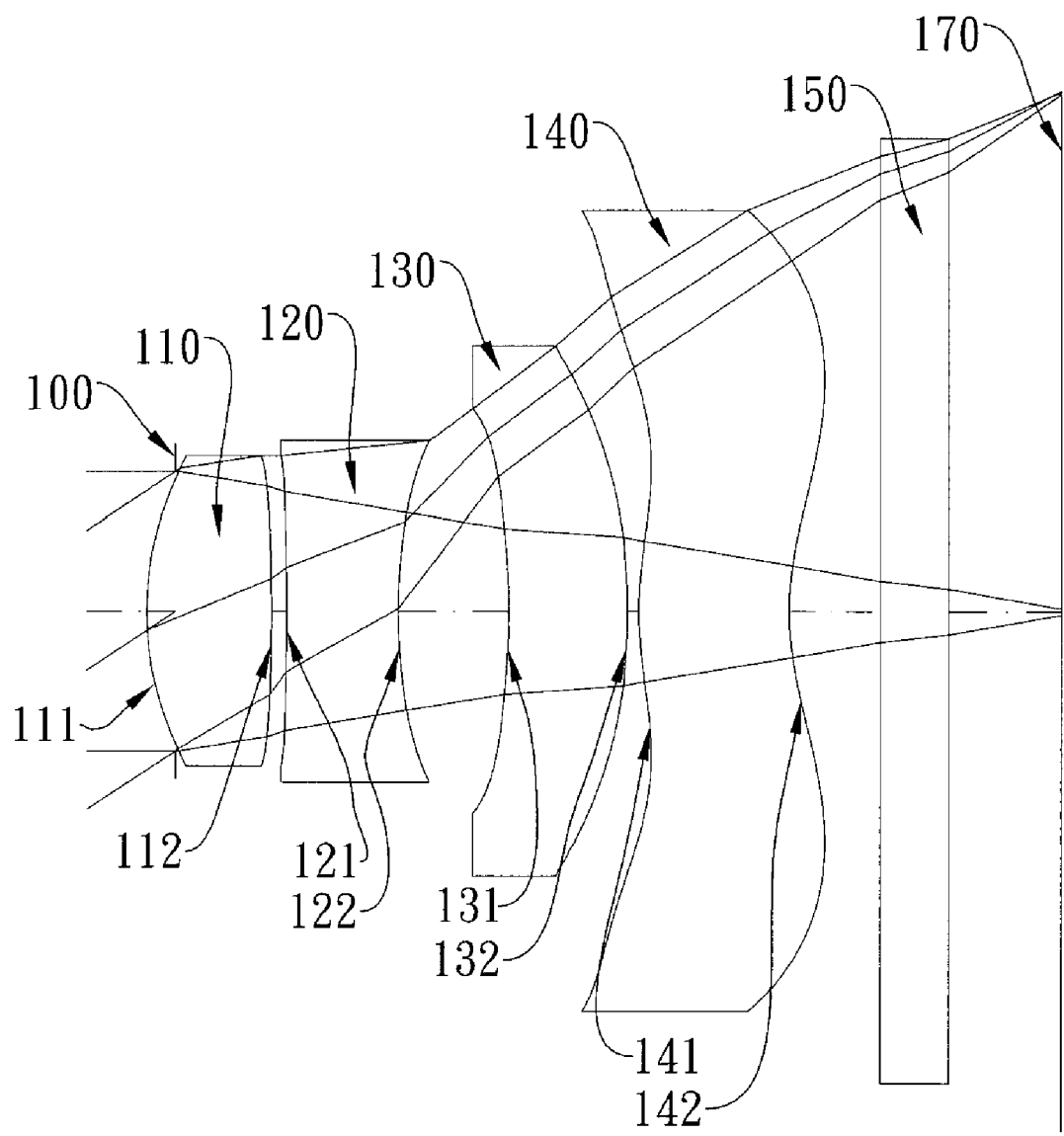
FIG. 1A shows a photographing lens assembly in accordance with a first embodiment of the present invention.

The present invention provides a photographing lens assembly comprising, in order from an object side to an image side: a first lens element with positive refractive power having a convex object-side surface and a convex image-side surface; a second lens element with negative refractive power having a concave object-side surface and a concave image-side surface; a third lens element with negative refractive power, the object-side and image-side surfaces thereof being aspheric; a fourth lens element with negative refractive power having a concave image-side surface on which at least one inflection point is formed; and an aperture stop disposed between an imaged object and the second lens element; wherein there are four lens elements with refractive power; and wherein the distance near the optical axis between the first and second lens elements is T12, the focal length of the photographing lens assembly is f, the Abbe number of the first lens element is V1, the Abbe number of the second lens element is V2, the focal length of the third lens element is f3, and they satisfy the relations: $0.50<(T12/f)*100<10.00$, $30.5<V1-V2<42.0$, $-60.0<(f/f3)*100<-0.5$.

When the relation of $0.50<(T12/f)*100<10.00$ is satisfied, the high order aberrations of the photographing lens assembly can be effectively corrected to improve the image quality of the system. Preferably, T12 and f satisfy the relation: $0.50<(T12/f)*100<3.00$. Furthermore, it is preferred that T12 and f satisfy the relation: $0.50<(T12/f)*100<1.45$.

When the relation of $30.5<V1-V2<42.0$ is satisfied, the chromatic aberration of the photographing lens assembly can be effectively corrected.

When the relation of $-60.0<(f/f3)*100<-0.5$ is satisfied, the third lens element functions as a correction lens to balance and correct various kinds of aberration of the system, thereby the photographing lens assembly can obtain higher resolution. Preferably, f and f3 satisfy the relation: $-20.0<(f/f3)*100<-0.5$.

In the aforementioned photographing lens assembly, it is preferred that the third lens element has a concave object-side surface so as to favorably correct the astigmatism of the system. Preferably, the fourth lens element is made of plastic material. Plastic lens elements are favorable not only for the formation of aspheric surfaces but also for the significantly lower production cost.

In the aforementioned photographing lens assembly, it is preferred that the aperture stop is disposed between an imaged object and the first lens element so that the telecentric feature is emphasized, resulting in a shorter total track length.

In the aforementioned photographing lens assembly, the focal length of the photographing lens assembly is f, the focal length of the first lens element is f1, and they preferably satisfy the relation: $1.30<f/f1<2.00$. When the above relation is satisfied, the refractive power of the first lens element is more balanced so that the total track length of the system can be effectively controlled to keep the photographing lens assembly compact. The above relation also prevents the high order spherical aberration from becoming too large, so that the image quality can be improved. Furthermore, it is preferred that f and f1 satisfy the relation: $1.45<f/f1<1.80$.

In the aforementioned photographing lens assembly, the radius of curvature of the object-side surface of the first lens element is R1, the focal length of the photographing lens assembly is f, and they preferably satisfy the relation: $0.33<R1/f<0.50$. When the above relation is satisfied, the total track length of the photographing lens assembly can be effectively reduced and the high order aberrations can be prevented from becoming too large.

In the aforementioned photographing lens assembly, the radius of curvature of the image-side surface of the second lens element is R4, the focal length of the photographing lens assembly is f, and they preferably satisfy the relation: $1.00<R4/f<3.00$. When the above relation is satisfied, the back focal length of the system can be effectively extended, thereby providing sufficient space to accommodate other components.

In the aforementioned photographing lens assembly, the thickness of the second lens element near the optical axis is CT2, and it preferably satisfies the relation: $0.10$ (mm) $<CT2<0.34$ (mm). When the above relation is satisfied, the thickness of the second lens element is more suitable in obtaining a balance between the manufacturing yield of the lens elements and the correction of the aberrations of the system.

In the aforementioned photographing lens assembly, the distance near the optical axis between the third and fourth lens elements is T34, the thickness of the fourth lens element near the optical axis is CT4, the focal length of the photographing lens assembly is f, and they preferably satisfy the relation: $0.05<(T34+CT4)/f<0.25$. When the above relation is satisfied, the lens elements can be placed closer together so that the total track length of the photographing lens assembly can be favorably reduced to keep the photographing lens assembly compact.

In the aforementioned photographing lens assembly, the radius of curvature of the object-side surface of the third lens element is R5, the radius of curvature of the image-side surface of the third lens element is R6, the radius of curvature of the object-side surface of the fourth lens element is R7, the radius of curvature of the image-side surface of the fourth lens element is R8, and they preferably satisfy the relations: $0.60<R5/R6<1.50$, $0.60<R7/R8<1.50$. When the above relations are satisfied, the refractive power of the third and fourth lens elements can be prevented from becoming too large, thereby attenuating of the sensitivity of the system favorably.

The aforementioned photographing lens assembly further comprises an electronic sensor disposed at the image plane for an object to be imaged thereon. The distance near the optical axis between the object-side surface of the first lens element and the electronic sensor is TTL, half of the diagonal length of the effective pixel area of the electronic sensor is ImgH, and they preferably satisfy the relation: $TTL/ImgH<2.05$. When the above relation is satisfied, it is favorable for the photographing lens assembly to maintain a compact form and be equipped in compact portable electronic products.

The present invention provides another photographing lens assembly comprising, in order from the object side to the image side: a first lens element with positive refractive power having a convex object-side surface; a second lens element with negative refractive power; a third lens element with negative refractive power having a concave object-side surface and a convex image-side surface, the object-side and image-side surfaces thereof being aspheric; a fourth lens element with negative refractive power having a concave image-side surface on which at least one inflection point is formed; and an aperture stop disposed between an imaged object and the second lens element; wherein the distance near the optical axis between the first and second lens elements is T12, the focal length of the photographing lens assembly is f, the Abbe number of the first lens element is V1, the Abbe number of the third lens element is V3, the refractive index of the second lens element is N2, the distance near the optical axis between the third and fourth lens elements is T34, the thickness of the fourth lens element near the optical axis is CT4, and they satisfy the relations: $0.50<(T12/f)*100<10.00$, $|V1-V3|<15.0$, $1.50<N2<1.66$, $0.05<(T34+CT4)/f<0.25$.

When the relation of $0.50<(T12/f)*100<10.00$ is satisfied, the high order aberrations of the photographing lens assembly can be effectively corrected to improve the image quality of the system. Preferably, T12 and f satisfy the relation: $0.50<(T12/f)*100<1.45$.

When the relation of $|V1-V3|<15.0$ is satisfied, the astigmatism of the photographing lens assembly can be corrected more favorably.

When the relation of $1.50<N2<1.66$ is satisfied, it is favorable for selecting an appropriate optical plastic material for the second lens element, thereby the photographing lens assembly can obtain better image quality.

When the relation of $0.05<(T34+CT4)/f<0.25$ is satisfied, the lens elements can be placed closer together, thereby the total track length of the photographing lens assembly can be favorably reduced to keep the photographing lens assembly compact.

In the aforementioned photographing lens assembly, it is preferred that the second lens element has a concave image-side surface so that the back focal length of the system can be favorably extended, thereby providing sufficient space to accommodate other components. Furthermore, it is preferred that the object-side and image-side surfaces of the second lens element are both concave so that the Petzval Sum of the system can be favorably corrected and the back focal length of the system can be extended as well.

In the aforementioned photographing lens assembly, it is preferred that the object-side and image-side surfaces of the fourth lens element are both aspheric. Aspheric surfaces can be easily made into non-spherical profiles, allowing more design parameter freedom which can be used to reduce aberrations and the number of the lens elements. Accordingly, the total track length of the system can be effectively reduced, and the image quality can be improved as well.

In the aforementioned photographing lens assembly, it is preferred that the aperture stop is disposed between an imaged object and the first lens element so that the telecentric feature is emphasized, resulting in a shorter total track length.

In the aforementioned photographing lens assembly, the focal length of the photographing lens assembly is f, the focal length of the first lens element is f1, and they preferably satisfy the relation: 1.30<f/f1<2.00. When the above relation is satisfied, the refractive power of the first lens element is more balanced, thereby the total track length of the system can be effectively controlled to keep the photographing lens assembly compact. The above relation also prevents the high order spherical aberration from becoming too large, so that the image quality can be improved. Furthermore, it is preferred that f and f1 satisfy the relation: 1.45<f/f1<1.80.

In the aforementioned photographing lens assembly, the Abbe number of the first lens element is V1, the Abbe number of the second lens element is V2, and they preferably satisfy the relation: 30.5<V1−V2<42.0. When the above relation is satisfied, the chromatic aberration of the photographing lens assembly can be effectively corrected.

In the aforementioned photographing lens assembly, the focal length of the photographing lens assembly is f, the focal length of the third lens element is f3, and they preferably satisfy the relation: −20.0<(f/f3)*100<−0.5. When the above relation is satisfied, the third lens element functions as a correction lens to balance and correct various kinds of aberration of the system. Consequently, the photographing lens assembly can obtain higher resolution.

In the aforementioned photographing lens assembly, the radius of curvature of the object-side surface of the third lens element is R5, the radius of curvature of the image-side surface of the third lens element is R6, the radius of curvature of the object-side surface of the fourth lens element is R7, the radius of curvature of the image-side surface of the fourth lens element is R8, and they preferably satisfy the relations: 0.60<R5/R6<1.50, 0.60<R7/R8<1.50. When the above relations are satisfied, the refractive power of the third and fourth lens elements can be prevented from becoming too large, thereby attenuating the sensitivity of the system favorably.

In the aforementioned photographing lens assembly, the radius of curvature of the image-side surface of the second lens element is R4, the focal length of the photographing lens assembly is f, and they preferably satisfy the relation: 1.00<R4/f<3.00. When the above relation is satisfied, the back focal length of the system can be effectively extended, thereby providing sufficient space to accommodate other components.

The aforementioned photographing lens assembly further comprises an electronic sensor disposed at the image plane for an object to be imaged thereon. The distance near the optical axis between the object-side surface of the first lens element and the electronic sensor is TTL, half of the diagonal length of the effective pixel area of the electronic sensor is ImgH, and they preferably satisfy the relation: TTL/ImgH<2.05. When the above relation is satisfied, it is favorable for the photographing lens assembly to maintain a compact form for applications in compact portable electronic products.

In the present photographing lens assembly, the lens elements can be made of glass or plastic material. If the lens elements are made of glass, there is more freedom in distributing the refractive power of the system. If plastic material is adopted to produce the lens elements, the production cost will be reduced effectively. Additionally, the surfaces of the lens elements can be aspheric and easily made into non-spherical profiles, allowing more design parameter freedom which can be used to reduce aberrations and the total number of the lens elements, so that the total track length of the photographing lens assembly can be effectively reduced.

In the present photographing lens assembly, if a lens element has a convex surface, it means the portion of the surface in proximity of the axis is convex; if a lens element has a concave surface, it means the portion of the surface in proximity of the axis is concave.

Preferred embodiments of the present invention will be described in the following paragraphs by referring to the accompanying drawings.

Figure 1B:
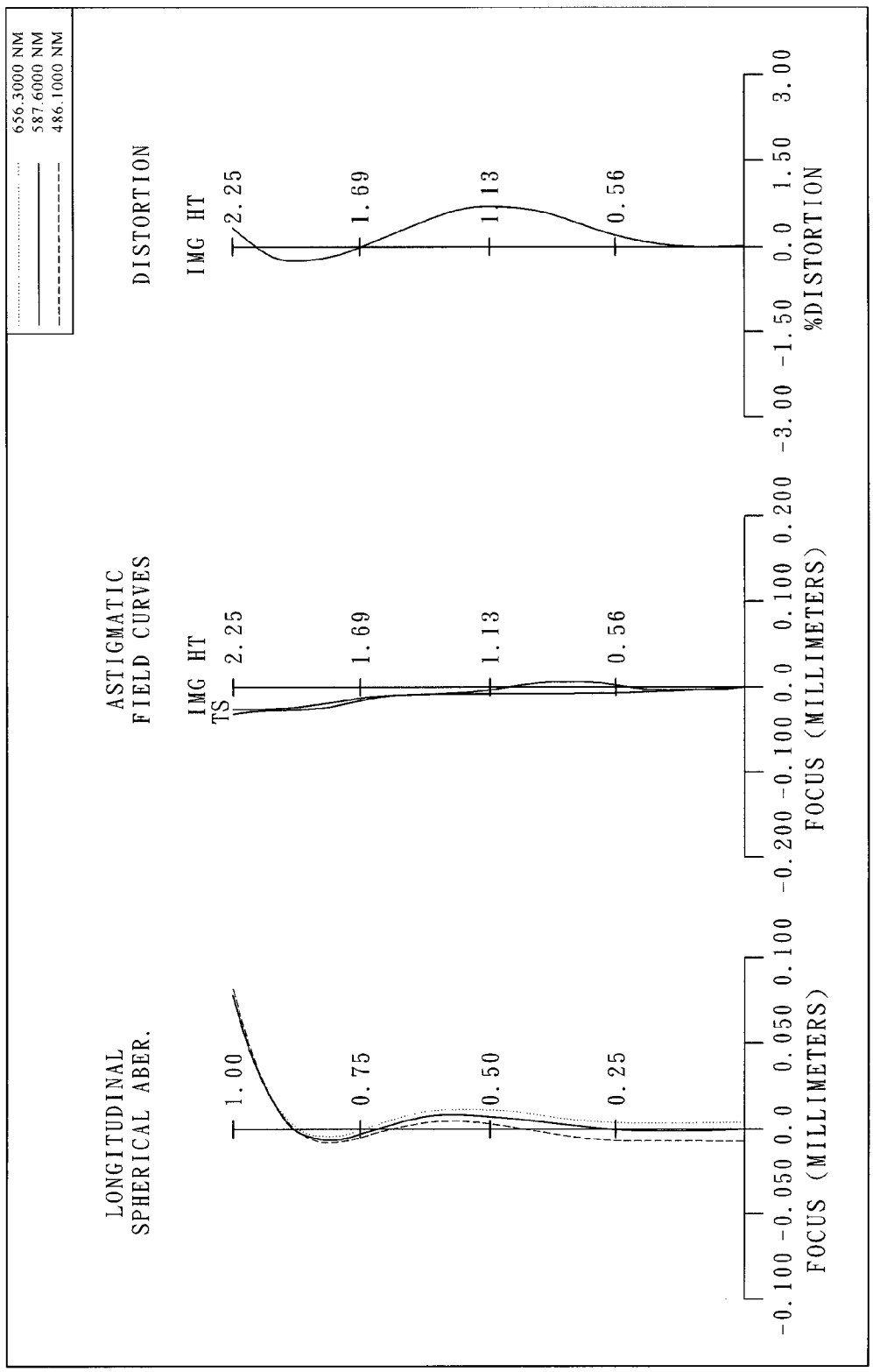
FIG. 1B shows the aberration curves of the first embodiment of the present invention.

FIG. 1A shows a photographing lens assembly in accordance with a first embodiment of the present invention, and FIG. 1B shows the aberration curves of the first embodiment of the present invention. The photographing lens assembly of the first embodiment of the present invention mainly comprises four lens elements, in order from an object side to an image side: a plastic first lens element 110 with positive refractive power having a convex object-side surface 111 and a convex image-side surface 112, the object-side and image-side surfaces 111 and 112 thereof being aspheric; a plastic second lens element 120 with negative refractive power having a concave object-side surface 121 and a concave image-side surface 122, the object-side and image-side surfaces 121 and 122 thereof being aspheric; a plastic third lens element 130 with negative refractive power having a concave object-side surface 131 and a convex image-side surface 132, the object-side and image-side surfaces 131 and 132 thereof being aspheric; and a plastic fourth lens element 140 with negative refractive power having a convex object-side surface 141 and a concave image-side surface 142 on which at least one inflection point is formed, the object-side and image-side surfaces 141 and 142 thereof being aspheric; wherein an aperture stop 100 is disposed between an imaged object and the first lens element 110; wherein the photographing lens assembly further comprises an IR filter 150 disposed between the image-side surface 142 of the fourth lens element 140 and an image plane 170; and wherein the IR filter 150 is made of glass and has no influence on the focal length of the photographing lens assembly.

The equation of the aspheric surface profiles is expressed as follows:

$$X(Y) = (Y^2/R)/(1 + sqrt(1 - (1+k)*(Y/R)^2)) + \sum_i (Ai)*(Y^i)$$

wherein:

X: the height of a point on the aspheric surface at a distance Y from the optical axis relative to the tangential plane at the aspheric surface vertex;

Y: the distance from the point on the curve of the aspheric surface to the optical axis;

k: the conic coefficient;

Ai: the aspheric coefficient of order i.

In the first embodiment of the present photographing lens assembly, the focal length of the photographing lens assembly is f, and it satisfies the relation: f=3.46 (mm).

In the first embodiment of the present photographing lens assembly, the f-number of the photographing lens assembly is Fno, and it satisfies the relation: Fno=2.85.

In the first embodiment of the present photographing lens assembly, half of the maximal field of view of the photographing lens assembly is HFOV, and it satisfies the relation: HFOV=33.1 deg.

In the first embodiment of the present photographing lens assembly, the Abbe number of the first lens element 110 is V1, the Abbe number of the second lens element 120 is V2, and they satisfy the relation: V1−V2=32.5.

In the first embodiment of the present photographing lens assembly, the Abbe number of the first lens element 110 is V1, the Abbe number of the third lens element 130 is V3, and they satisfy the relation: |V1−V3|=0.0.

In the first embodiment of the present photographing lens assembly, the refractive index of the second lens element 120 is N2, and it satisfies the relation: N2=1.632.

In the first embodiment of the present photographing lens assembly, the thickness of the second lens element 120 near the optical axis is CT2, and it satisfies the relation: CT2=0.491 (mm).

In the first embodiment of the present photographing lens assembly, the distance near the optical axis between the first lens element 110 and the second lens element 120 is T12, the focal length of the photographing lens assembly is f, and they satisfy the relation: (T12/f)*100=1.99.

In the first embodiment of the present photographing lens assembly, the distance near the optical axis between the third lens element 130 and the fourth lens element 140 is T34, the thickness of the fourth lens element 140 near the optical axis is CT4, the focal length of the photographing lens assembly is f, and they satisfy the relation: (T34+CT4)/f=0.20.

In the first embodiment of the present photographing lens assembly, the radius of curvature of the object-side surface 111 of the first lens element 110 is R1, the focal length of the photographing lens assembly is f, and they satisfy the relation: R1/f=0.38.

In the first embodiment of the present photographing lens assembly, the radius of curvature of the image-side surface 122 of the second lens element 120 is R4, the focal length of the photographing lens assembly is f, and they satisfy the relation: R4/f=0.81.

In the first embodiment of the present photographing lens assembly, the radius of curvature of the object-side surface 131 of the third lens element 130 is R5, the radius of curvature of the image-side surface 132 of the third lens element 130 is R6, and they satisfy the relation: R5/R6=0.92.

In the first embodiment of the present photographing lens assembly, the radius of curvature of the object-side surface 141 of the fourth lens element 140 is R7, the radius of curvature of the image-side surface 142 of the fourth lens element 140 is R8, and they satisfy the relation: R7/R8=1.22.

In the first embodiment of the present photographing lens assembly, the focal length of the photographing lens assembly is f, the focal length of the first lens element 110 is f1, and they satisfy the relation: f/f1=1.57.

In the first embodiment of the present photographing lens assembly, the focal length of the photographing lens assembly is f, the focal length of the third lens element 130 is f3, and they satisfy the relation: (f/f3)*100=−1.25.

In the first embodiment of the present photographing lens assembly, the photographing lens assembly further comprises an electronic sensor disposed at the image plane 170 for an object to be imaged thereon. The distance near the optical axis between the object-side surface 111 of the first lens element 110 and the electronic sensor is TTL, half of the diagonal length of the effective pixel area of the electronic sensor is ImgH, and they satisfy the relation: TTL/ImgH=1.74.

The detailed optical data of the first embodiment is shown in FIG. 9 (TABLE 1), and the aspheric surface data is shown in FIG. 10 (TABLE 2), wherein the units of the radius of curvature, the thickness and the focal length are expressed in mm, and HFOV is half of the maximal field of view.

Figure 2A:
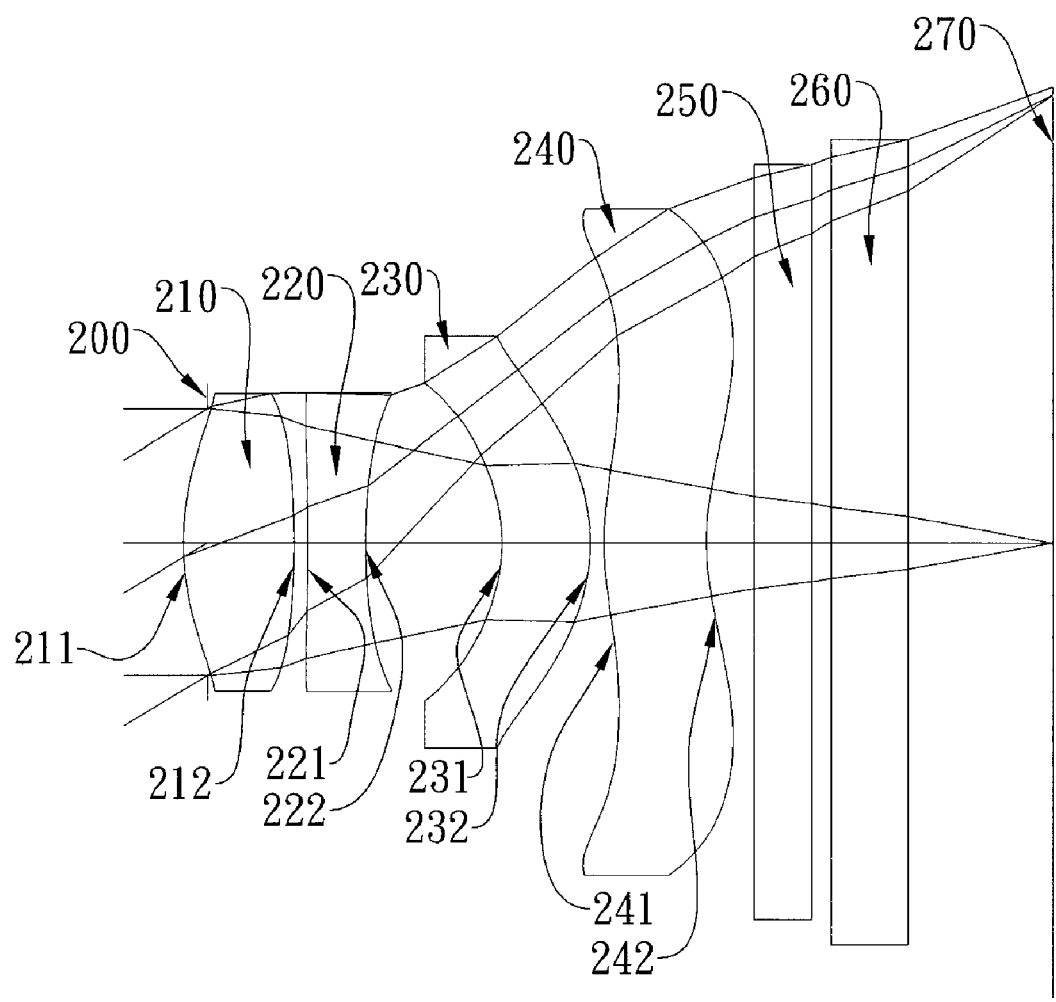
FIG. 2A shows a photographing lens assembly in accordance with a second embodiment of the present invention.
Figure 2B:
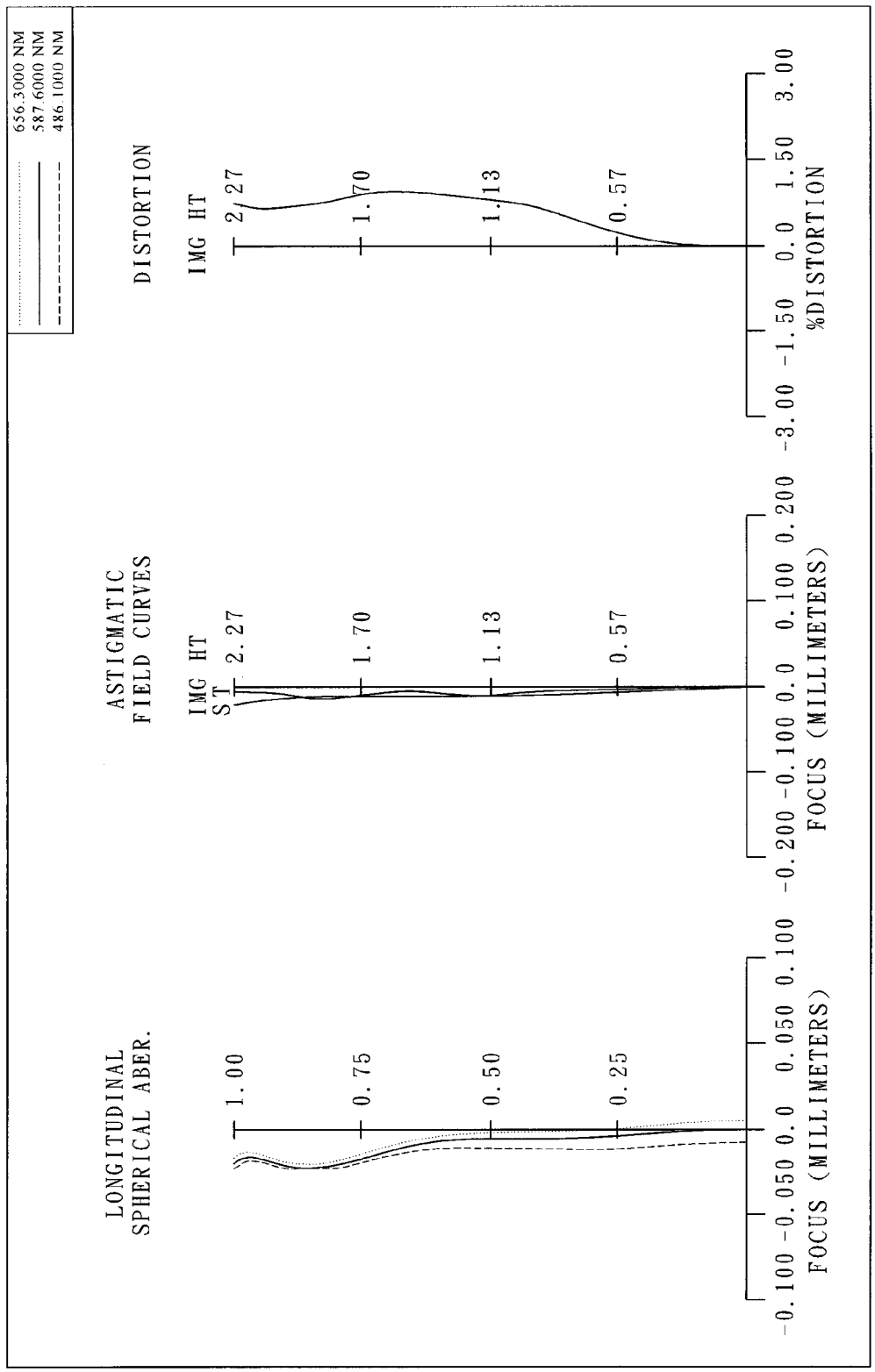
FIG. 2B shows the aberration curves of the second embodiment of the present invention.

FIG. 2A shows a photographing lens assembly in accordance with a second embodiment of the present invention, and FIG. 2B shows the aberration curves of the second embodiment of the present invention. The photographing lens assembly of the second embodiment of the present invention mainly comprises four lens elements, in order from the object side to the image side: a plastic first lens element 210 with positive refractive power having a convex object-side surface 211 and a convex image-side surface 212, the object-side and image-side surfaces 211 and 212 thereof being aspheric; a plastic second lens element 220 with negative refractive power having a concave object-side surface 221 and a concave image-side surface 222, the object-side and image-side surfaces 221 and 222 thereof being aspheric; a plastic third lens element 230 with negative refractive power having a concave object-side surface 231 and a convex image-side surface 232, the object-side and image-side surfaces 231 and 232 thereof being aspheric; and a plastic fourth lens element 240 with negative refractive power having a convex object-side surface 241 and a concave image-side surface 242 on which at least one inflection point is formed, the object-side and image-side surfaces 241 and 242 thereof being aspheric; wherein an aperture stop 200 is disposed between an imaged object and the first lens element 210; wherein the photographing lens assembly further comprises an IR filter 250 disposed between the image-side surface 242 of the fourth lens element 240 and an image plane 270 and a cover glass 260 disposed between the IR filter 250 and the image plane 270; and wherein the IR filter 250 and the cover glass 260 are made of glass and have no influence on the focal length of the photographing lens assembly.

The equation of the aspheric surface profiles of the second embodiment has the same form as that of the first embodiment.

In the second embodiment of the present photographing lens assembly, the focal length of the photographing lens assembly is f, and it satisfies the relation: f=3.85 (mm).

In the second embodiment of the present photographing lens assembly, the f-number of the photographing lens assembly is Fno, and it satisfies the relation: Fno=2.85.

In the second embodiment of the present photographing lens assembly, half of the maximal field of view of the photographing lens assembly is HFOV, and it satisfies the relation: HFOV=30.4 deg.

In the second embodiment of the present photographing lens assembly, the Abbe number of the first lens element 210 is V1, the Abbe number of the second lens element 220 is V2, and they satisfy the relation: V1−V2=32.5.

In the second embodiment of the present photographing lens assembly, the Abbe number of the first lens element 210 is V1, the Abbe number of the third lens element 230 is V3, and they satisfy the relation: |V1−V3|=0.0.

In the second embodiment of the present photographing lens assembly, the refractive index of the second lens element 220 is N2, and it satisfies the relation: N2=1.632.

In the second embodiment of the present photographing lens assembly, the thickness of the second lens element 220 near the optical axis is CT2, and it satisfies the relation: CT2=0.300 (mm).

In the second embodiment of the present photographing lens assembly, the distance near the optical axis between the first lens element 210 and the second lens element 220 is T12, the focal length of the photographing lens assembly is f, and they satisfy the relation: (T12/f)*100=1.82.

In the second embodiment of the present photographing lens assembly, the distance near the optical axis between the third lens element 230 and the fourth lens element 240 is T34, the thickness of the fourth lens element 240 near the optical axis is CT4, the focal length of the photographing lens assembly is f, and they satisfy the relation: (T34+CT4)/f=0.16.

In the second embodiment of the present photographing lens assembly, the radius of curvature of the object-side surface 211 of the first lens element 210 is R1, the focal length of the photographing lens assembly is f, and they satisfy the relation: R1/f=0.38.

In the second embodiment of the present photographing lens assembly, the radius of curvature of the image-side surface 222 of the second lens element 220 is R4, the focal length of the photographing lens assembly is f, and they satisfy the relation: R4/f=0.83.

In the second embodiment of the present photographing lens assembly, the radius of curvature of the object-side surface 231 of the third lens element 230 is R5, the radius of curvature of the image-side surface 232 of the third lens element 230 is R6, and they satisfy the relation: R5/R6=0.84.

In the second embodiment of the present photographing lens assembly, the radius of curvature of the object-side surface 241 of the fourth lens element 240 is R7, the radius of curvature of the image-side surface 242 of the fourth lens element 240 is R8, and they satisfy the relation: R7/R8=1.17.

In the second embodiment of the present photographing lens assembly, the focal length of the photographing lens assembly is f, the focal length of the first lens element 210 is f1, and they satisfy the relation: f/f1=1.78.

In the second embodiment of the present photographing lens assembly, the focal length of the photographing lens assembly is f, the focal length of the third lens element 230 is f3, and they satisfy the relation: (f/f3)*100=−3.11.

In the second embodiment of the present photographing lens assembly, the photographing lens assembly further comprises an electronic sensor disposed at the image plane 270 for an object to be imaged thereon. The distance near the optical axis between the object-side surface 211 of the first lens element 210 and the electronic sensor is TTL, half of the diagonal length of the effective pixel area of the electronic sensor is ImgH, and they satisfy the relation: TTL/ImgH=1.88.

The detailed optical data of the second embodiment is shown in FIG. 11 (TABLE 3), and the aspheric surface data is shown in FIGS. 12A and 12B (TABLES 4A and 4B), wherein the units of the radius of curvature, the thickness and the focal length are expressed in mm, and HFOV is half of the maximal field of view.

Figure 3A:
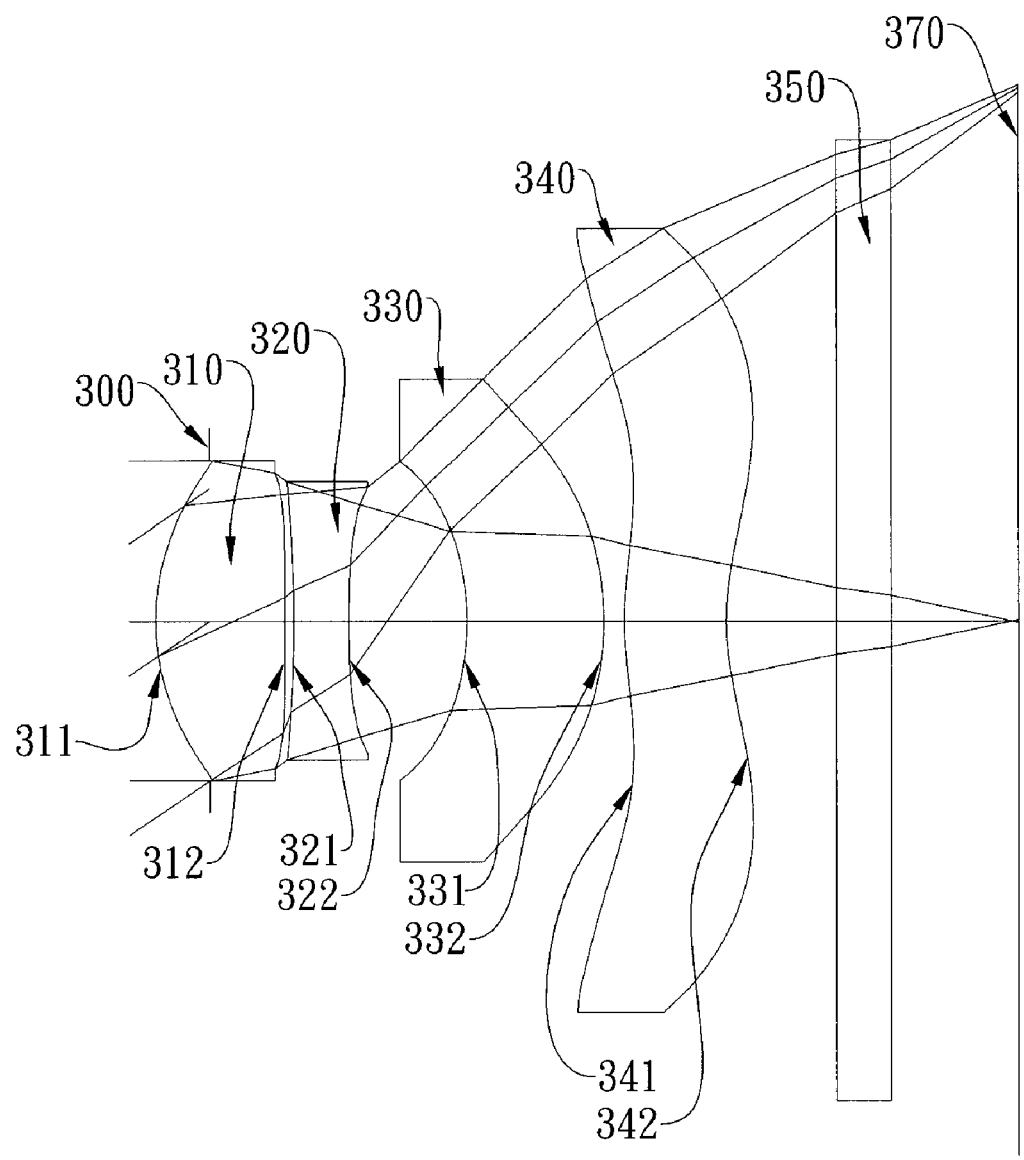
FIG. 3A shows a photographing lens assembly in accordance with a third embodiment of the present invention.
Figure 3B:
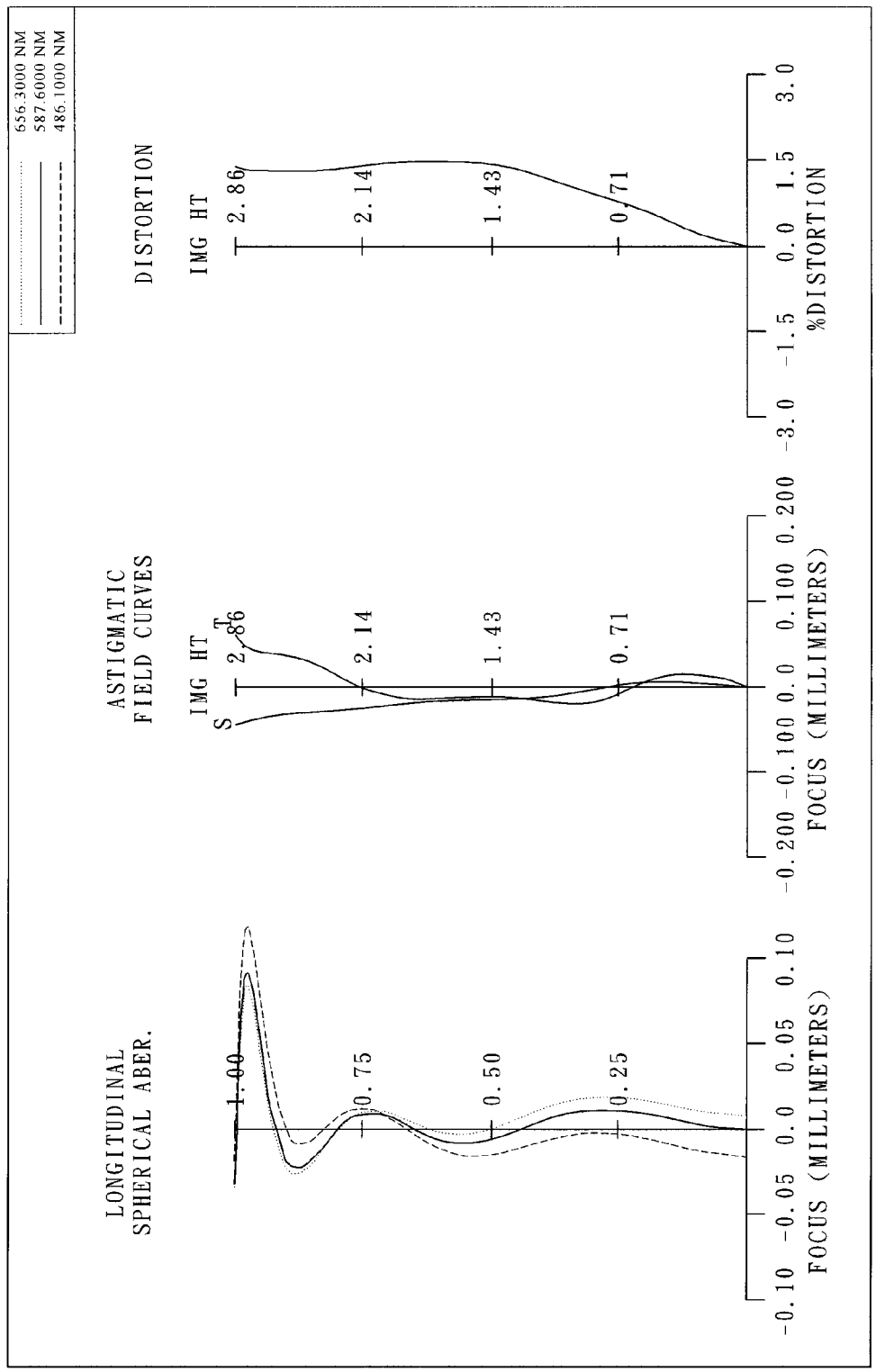
FIG. 3B shows the aberration curves of the third embodiment of the present invention.

FIG. 3A shows a photographing lens assembly in accordance with a third embodiment of the present invention, and FIG. 3B shows the aberration curves of the third embodiment of the present invention. The photographing lens assembly of the third embodiment of the present invention mainly comprises four lens elements, in order from the object side to the image side: a plastic first lens element 310 with positive refractive power having a convex object-side surface 311 and a concave image-side surface 312, the object-side and image-side surfaces 311 and 312 thereof being aspheric; a plastic second lens element 320 with negative refractive power having a concave object-side surface 321 and a concave image-side surface 322, the object-side and image-side surfaces 321 and 322 thereof being aspheric; a plastic third lens element 330 with negative refractive power having a concave object-side surface 331 and a convex image-side surface 332, the object-side and image-side surfaces 331 and 332 thereof being aspheric; and a plastic fourth lens element 340 with negative refractive power having a convex object-side surface 341 and a concave image-side surface 342 on which at least one inflection point is formed, the object-side and image-side surfaces 341 and 342 thereof being aspheric; wherein an aperture stop 300 is disposed between an imaged object and the first lens element 310; wherein the photographing lens assembly further comprises an IR filter 350 disposed between the image-side surface 342 of the fourth lens element 340 and an image plane 370; and wherein the IR filter 350 is made of glass and has no influence on the focal length of the photographing lens assembly.

The equation of the aspheric surface profiles of the third embodiment has the same form as that of the first embodiment.

In the third embodiment of the present photographing lens assembly, the focal length of the photographing lens assembly is f, and it satisfies the relation: f=4.27 (mm).

In the third embodiment of the present photographing lens assembly, the f-number of the photographing lens assembly is Fno, and it satisfies the relation: Fno=2.48.

In the third embodiment of the present photographing lens assembly, half of the maximal field of view of the photographing lens assembly is HFOV, and it satisfies the relation: HFOV=33.5 deg.

In the third embodiment of the present photographing lens assembly, the Abbe number of the first lens element 310 is V1, the Abbe number of the second lens element 320 is V2, and they satisfy the relation: V1−V2=32.5.

In the third embodiment of the present photographing lens assembly, the Abbe number of the first lens element 310 is V1, the Abbe number of the third lens element 330 is V3, and they satisfy the relation: |V1−V3|=0.0.

In the third embodiment of the present photographing lens assembly, the refractive index of the second lens element 320 is N2, and it satisfies the relation: N2=1.632.

In the third embodiment of the present photographing lens assembly, the thickness of the second lens element 320 near the optical axis is CT2, and it satisfies the relation: CT2=0.300 (mm).

In the third embodiment of the present photographing lens assembly, the distance near the optical axis between the first lens element 310 and the second lens element 320 is T12, the focal length of the photographing lens assembly is f, and they satisfy the relation: (T12/f)*100=1.17.

In the third embodiment of the present photographing lens assembly, the distance near the optical axis between the third lens element 330 and the fourth lens element 340 is T34, the thickness of the fourth lens element 340 near the optical axis is CT4, the focal length of the photographing lens assembly is f, and they satisfy the relation: (T34+CT4)/f=0.16.

In the third embodiment of the present photographing lens assembly, the radius of curvature of the object-side surface 311 of the first lens element 310 is R1, the focal length of the photographing lens assembly is f, and they satisfy the relation: R1/f=0.30.

In the third embodiment of the present photographing lens assembly, the radius of curvature of the image-side surface 322 of the second lens element 320 is R4, the focal length of the photographing lens assembly is f, and they satisfy the relation: R4/f=1.42.

In the third embodiment of the present photographing lens assembly, the radius of curvature of the object-side surface 331 of the third lens element 330 is R5, the radius of curvature of the image-side surface 332 of the third lens element 330 is R6, and they satisfy the relation: R5/R6=0.83.

In the third embodiment of the present photographing lens assembly, the radius of curvature of the object-side surface 341 of the fourth lens element 340 is R7, the radius of curvature of the image-side surface 342 of the fourth lens element 340 is R8, and they satisfy the relation: R7/R8=1.30.

In the third embodiment of the present photographing lens assembly, the focal length of the photographing lens assembly is f, the focal length of the first lens element 310 is f1, and they satisfy the relation: f/f1=1.81.

In the third embodiment of the present photographing lens assembly, the focal length of the photographing lens assembly is f, the focal length of the third lens element 330 is f3, and they satisfy the relation: (f/f3)*100=−2.57.

In the third embodiment of the present photographing lens assembly, the photographing lens assembly further comprises an electronic sensor disposed at the image plane 370 for an object to be imaged thereon. The distance near the optical axis between the object-side surface 311 of the first lens element 310 and the electronic sensor is TTL, half of the diagonal length of the effective pixel area of the electronic sensor is ImgH, and they satisfy the relation: TTL/ImgH=1.62.

The detailed optical data of the third embodiment is shown in FIG. 13 (TABLE 5), and the aspheric surface data is shown in FIGS. 14A and 14B (TABLES 6A and 6B), wherein the units of the radius of curvature, the thickness and the focal length are expressed in mm, and HFOV is half of the maximal field of view.

Figure 4A:
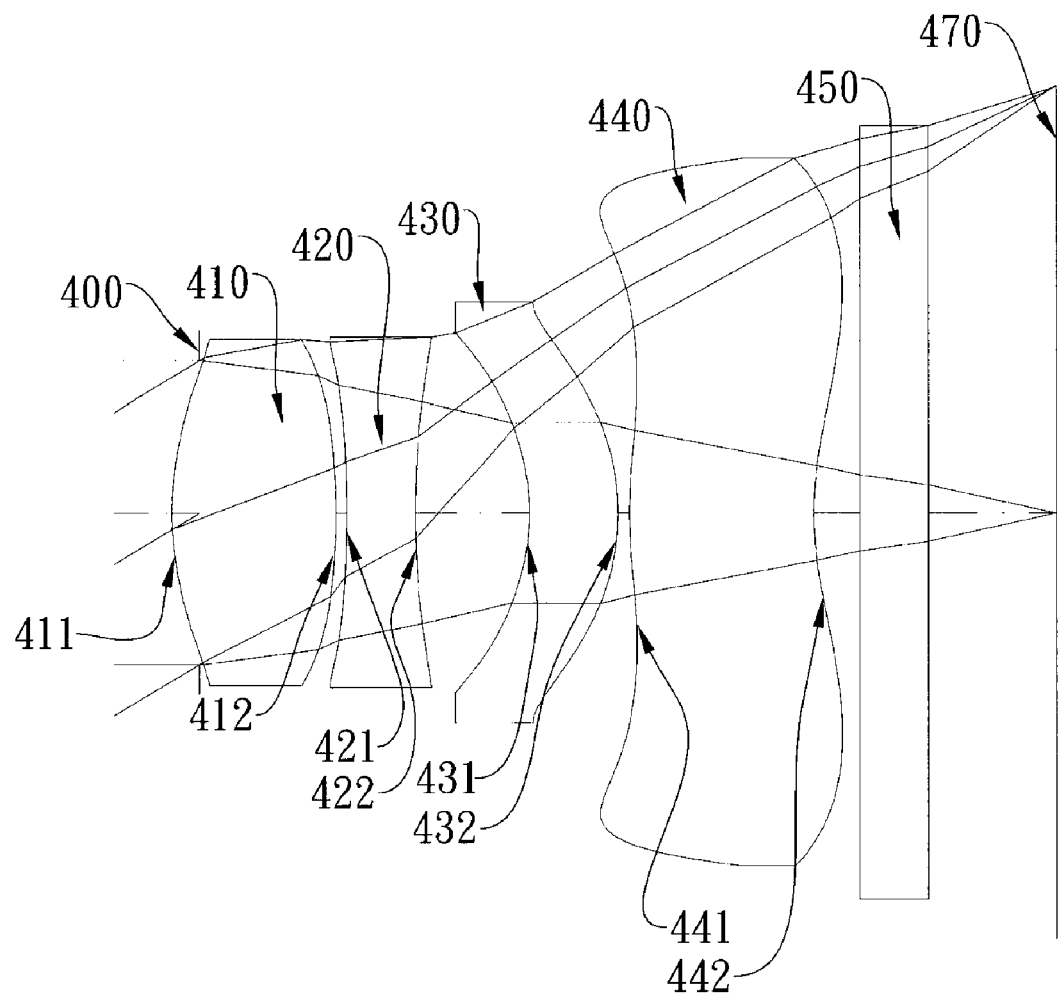
FIG. 4A shows a photographing lens assembly in accordance with a fourth embodiment of the present invention.
Figure 4B:
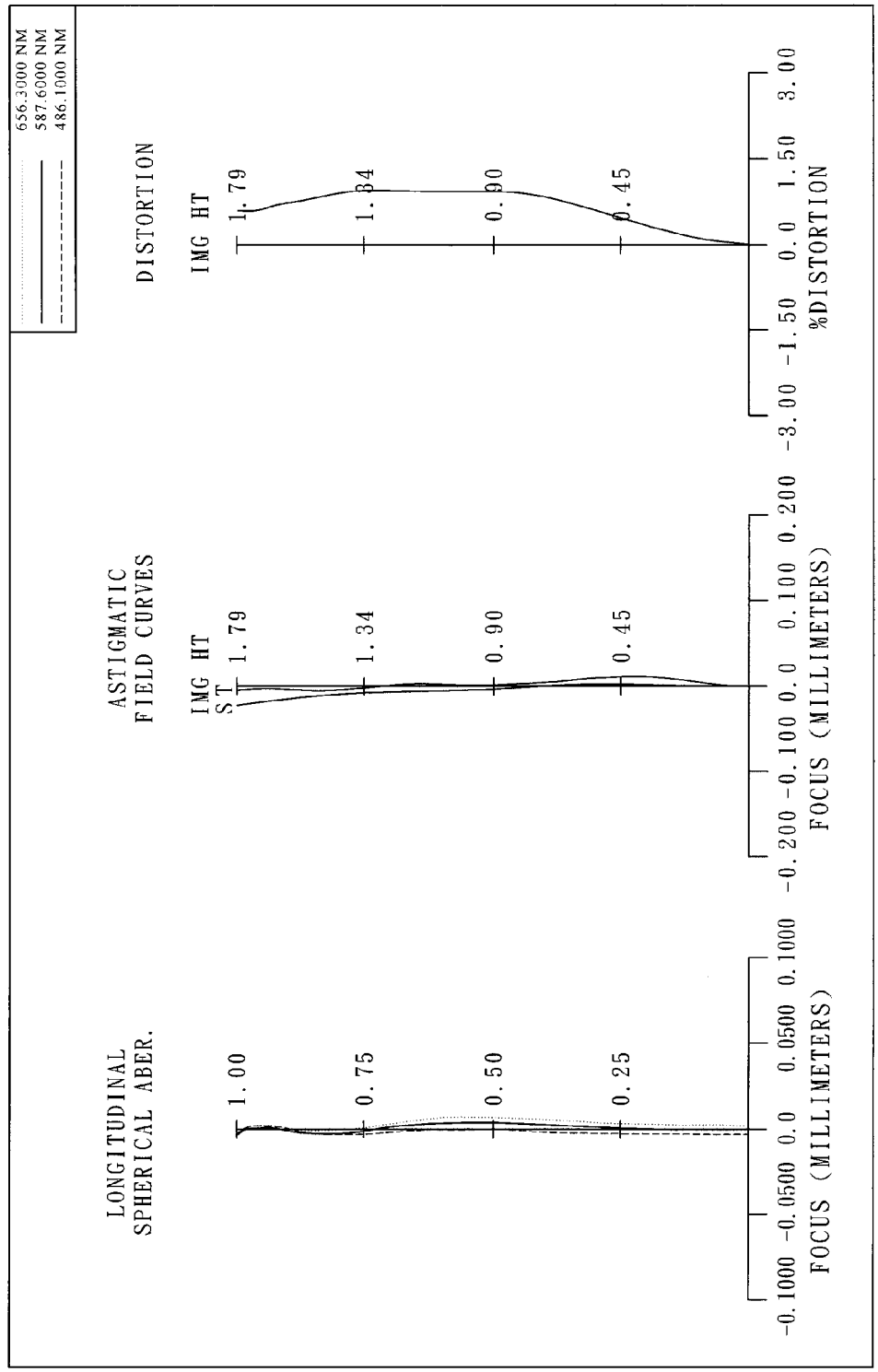
FIG. 4B shows the aberration curves of the fourth embodiment of the present invention.

FIG. 4A shows a photographing lens assembly in accordance with a fourth embodiment of the present invention, and FIG. 4B shows the aberration curves of the fourth embodiment of the present invention. The photographing lens assembly of the fourth embodiment of the present invention mainly comprises four lens elements, in order from the object side to the image side: a plastic first lens element 410 with positive refractive power having a convex object-side surface 411 and a convex image-side surface 412, the object-side and image-side surfaces 411 and 412 thereof being aspheric; a plastic second lens element 420 with negative refractive power having a concave object-side surface 421 and a concave image-side surface 422, the object-side and image-side surfaces 421 and 422 thereof being aspheric; a plastic third lens element 430 with negative refractive power having a concave object-side surface 431 and a convex image-side surface 432, the object-side and image-side surfaces 431 and 432 thereof being aspheric; and a plastic fourth lens element 440 with negative refractive power having a convex object-side surface 441 and a concave image-side surface 442 on which at least one inflection point is formed, the object-side and image-side surfaces 441 and 442 thereof being aspheric; wherein an aperture stop 400 is disposed between an imaged object and the first lens element 410; wherein the photographing lens assembly further comprises an IR filter 450 disposed between the image-side surface 442 of the fourth lens element 440 and an image plane 470; and wherein the IR filter 450 is made of glass and has no influence on the focal length of the photographing lens assembly.

The equation of the aspheric surface profiles of the fourth embodiment has the same form as that of the first embodiment.

In the fourth embodiment of the present photographing lens assembly, the focal length of the photographing lens assembly is f, and it satisfies the relation: f=3.08 (mm).

In the fourth embodiment of the present photographing lens assembly, the f-number of the photographing lens assembly is Fno, and it satisfies the relation: Fno=2.40.

In the fourth embodiment of the present photographing lens assembly, half of the maximal field of view of the photographing lens assembly is HFOV, and it satisfies the relation: HFOV=30.1 deg.

In the fourth embodiment of the present photographing lens assembly, the Abbe number of the first lens element 410 is V1, the Abbe number of the second lens element 420 is V2, and they satisfy the relation: V1−V2=32.5.

In the fourth embodiment of the present photographing lens assembly, the Abbe number of the first lens element 410 is V1, the Abbe number of the third lens element 430 is V3, and they satisfy the relation: |V1−V3|=0.0.

In the fourth embodiment of the present photographing lens assembly, the refractive index of the second lens element 420 is N2, and it satisfies the relation: N2=1.632.

In the fourth embodiment of the present photographing lens assembly, the thickness of the second lens element 420 near the optical axis is CT2, and it satisfies the relation: CT2=0.300 (mm).

In the fourth embodiment of the present photographing lens assembly, the distance near the optical axis between the first lens element 410 and the second lens element 420 is T12, the focal length of the photographing lens assembly is f, and they satisfy the relation: (T12/f)*100=1.46.

In the fourth embodiment of the present photographing lens assembly, the distance near the optical axis between the third lens element 430 and the fourth lens element 440 is T34, the thickness of the fourth lens element 440 near the optical axis is CT4, the focal length of the photographing lens assembly is f, and they satisfy the relation: (T34+CT4)/f=0.28.

In the fourth embodiment of the present photographing lens assembly, the radius of curvature of the object-side surface 411 of the first lens element 410 is R1, the focal length of the photographing lens assembly is f, and they satisfy the relation: R1/f=0.47.

In the fourth embodiment of the present photographing lens assembly, the radius of curvature of the image-side surface 422 of the second lens element 420 is R4, the focal length of the photographing lens assembly is f, and they satisfy the relation: R4/f=1.50.

In the fourth embodiment of the present photographing lens assembly, the radius of curvature of the object-side surface 431 of the third lens element 430 is R5, the radius of curvature of the image-side surface 432 of the third lens element 430 is R6, and they satisfy the relation: R5/R6=0.85.

In the fourth embodiment of the present photographing lens assembly, the radius of curvature of the object-side surface 441 of the fourth lens element 440 is R7, the radius of curvature of the image-side surface 442 of the fourth lens element 440 is R8, and they satisfy the relation: R7/R8=1.28.

In the fourth embodiment of the present photographing lens assembly, the focal length of the photographing lens assembly is f, the focal length of the first lens element 410 is f1, and they satisfy the relation: f/f1=1.75.

In the fourth embodiment of the present photographing lens assembly, the focal length of the photographing lens assembly is f, the focal length of the third lens element 430 is f3, and they satisfy the relation: (f/f3)*100=−3.11.

In the fourth embodiment of the present photographing lens assembly, the photographing lens assembly further comprises an electronic sensor disposed at the image plane 470 for an object to be imaged thereon. The distance near the optical axis between the object-side surface 411 of the first lens element 410 and the electronic sensor is TTL, half of the diagonal length of the effective pixel area of the electronic sensor is ImgH, and they satisfy the relation: TTL/ImgH=2.10.

The detailed optical data of the fourth embodiment is shown in FIG. 15 (TABLE 7), and the aspheric surface data is shown in FIG. 16 (TABLE 8), wherein the units of the radius of curvature, the thickness and the focal length are expressed in mm, and HFOV is half of the maximal field of view.

Figure 5A:
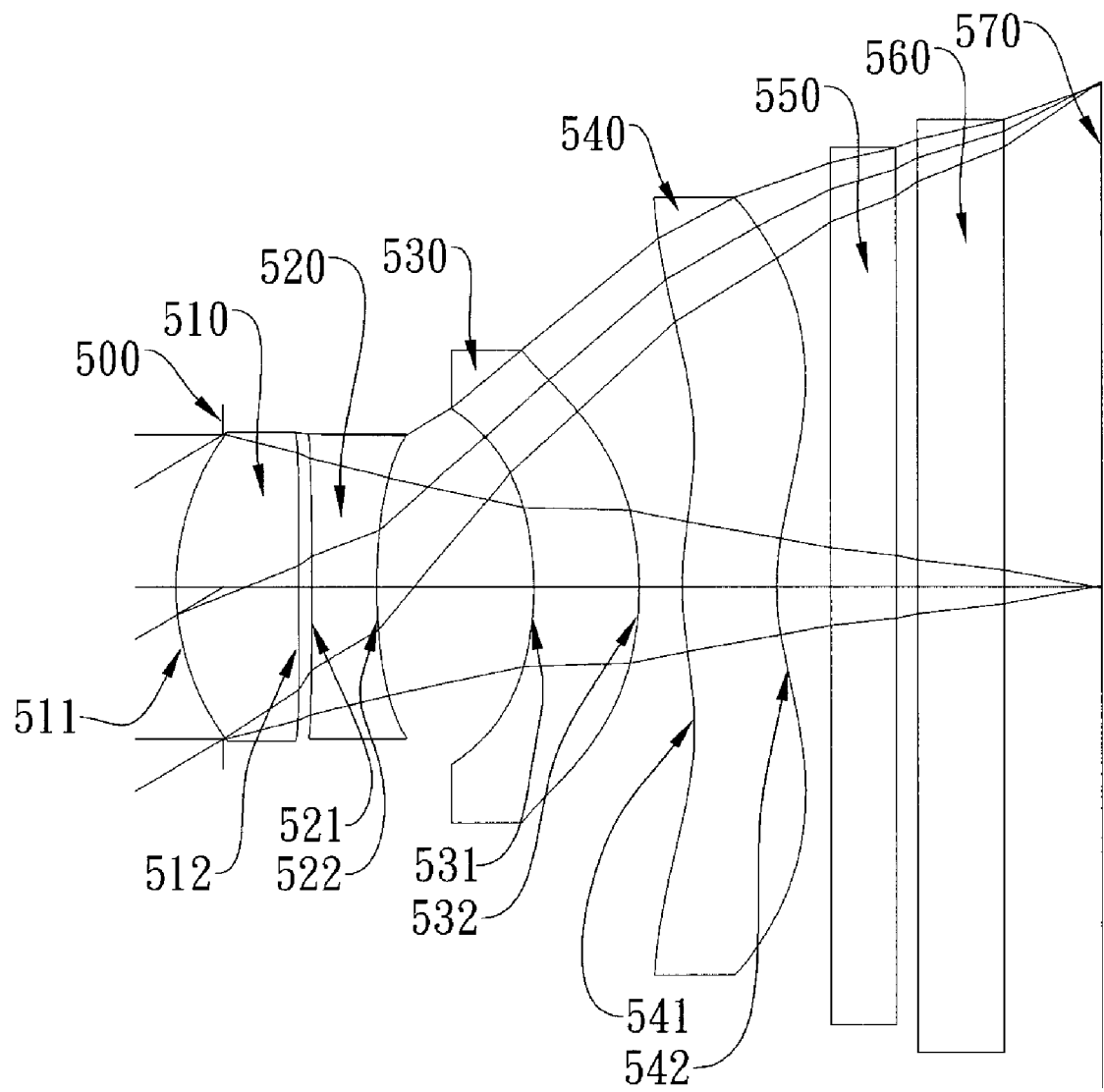
FIG. 5A shows a photographing lens assembly in accordance with a fifth embodiment of the present invention.
Figure 5B:
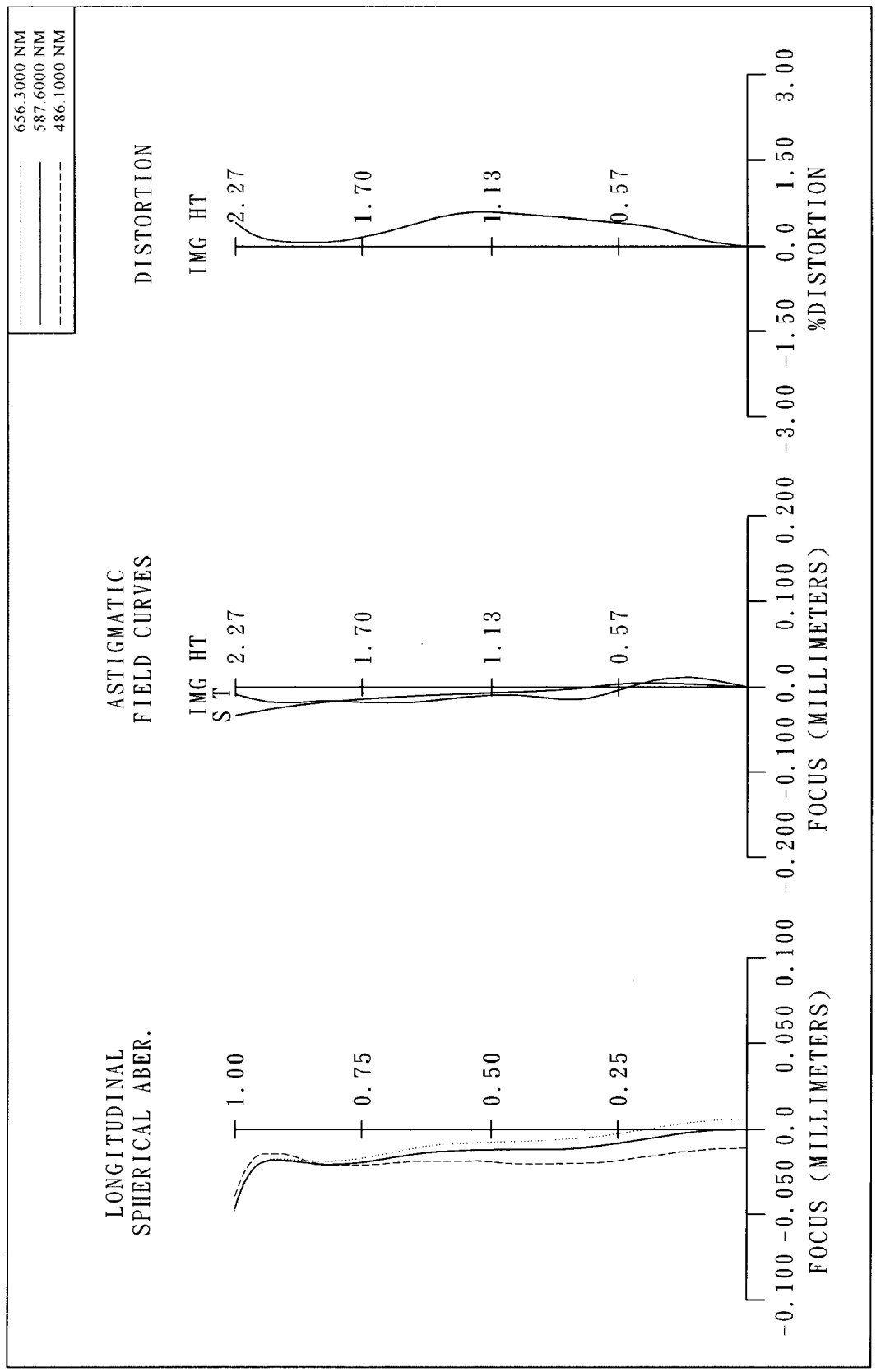
FIG. 5B shows the aberration curves of the fifth embodiment of the present invention.

FIG. 5A shows a photographing lens assembly in accordance with a fifth embodiment of the present invention, and FIG. 5B shows the aberration curves of the fifth embodiment of the present invention. The photographing lens assembly of the fifth embodiment of the present invention mainly comprises four lens elements, in order from the object side to the image side: a plastic first lens element 510 with positive refractive power having a convex object-side surface 511 and a concave image-side surface 512, the object-side and image-side surfaces 511 and 512 thereof being aspheric; a plastic second lens element 520 with negative refractive power having a concave object-side surface 521 and a concave image-side surface 522, the object-side and image-side surfaces 521 and 522 thereof being aspheric; a plastic third lens element 530 with negative refractive power having a concave object-side surface 531 and a convex image-side surface 532, the object-side and image-side surfaces 531 and 532 thereof being aspheric; and a plastic fourth lens element 540 with negative refractive power having a convex object-side surface 541 and a concave image-side surface 542 on which at least one inflection point is formed, the object-side and image-side surfaces 541 and 542 thereof being aspheric; wherein an aperture stop 500 is disposed between an imaged object and the first lens element 510; wherein the photographing lens assembly further comprises an IR filter 550 disposed between the image-side surface 542 of the fourth lens element 540 and an image plane 570 and a cover glass 560 disposed between the IR filter 550 and the image plane 570; and wherein the IR filter 550 and the cover glass 560 are made of glass and have no influence on the focal length of the photographing lens assembly.

The equation of the aspheric surface profiles of the fifth embodiment has the same form as that of the first embodiment.

In the fifth embodiment of the present photographing lens assembly, the focal length of the photographing lens assembly is f, and it satisfies the relation: f=3.90 (mm).

In the fifth embodiment of the present photographing lens assembly, the f-number of the photographing lens assembly is Fno, and it satisfies the relation: Fno=2.85.

In the fifth embodiment of the present photographing lens assembly, half of the maximal field of view of the photographing lens assembly is HFOV, and it satisfies the relation: HFOV=30.2 deg.

In the fifth embodiment of the present photographing lens assembly, the Abbe number of the first lens element 510 is V1, the Abbe number of the second lens element 520 is V2, and they satisfy the relation: V1−V2=32.5.

In the fifth embodiment of the present photographing lens assembly, the Abbe number of the first lens element 510 is V1, the Abbe number of the third lens element 530 is V3, and they satisfy the relation: |V1−V3|=0.0.

In the fifth embodiment of the present photographing lens assembly, the refractive index of the second lens element 520 is N2, and it satisfies the relation: N2=1.632.

In the fifth embodiment of the present photographing lens assembly, the thickness of the second lens element 520 near the optical axis is CT2, and it satisfies the relation: CT2=0.300 (mm).

In the fifth embodiment of the present photographing lens assembly, the distance near the optical axis between the first lens element 510 and the second lens element 520 is T12, the focal length of the photographing lens assembly is f, and they satisfy the relation: (T12/f)*100=1.59.

In the fifth embodiment of the present photographing lens assembly, the distance near the optical axis between the third lens element 530 and the fourth lens element 540 is T34, the thickness of the fourth lens element 540 near the optical axis is CT4, the focal length of the photographing lens assembly is f, and they satisfy the relation: (T34+CT4)/f=0.16.

In the fifth embodiment of the present photographing lens assembly, the radius of curvature of the object-side surface 511 of the first lens element 510 is R1, the focal length of the photographing lens assembly is f, and they satisfy the relation: R1/f=0.29.

In the fifth embodiment of the present photographing lens assembly, the radius of curvature of the image-side surface 522 of the second lens element 520 is R4, the focal length of the photographing lens assembly is f, and they satisfy the relation: R4/f=0.66.

In the fifth embodiment of the present photographing lens assembly, the radius of curvature of the object-side surface 531 of the third lens element 530 is R5, the radius of curvature of the image-side surface 532 of the third lens element 530 is R6, and they satisfy the relation: R5/R6=0.87.

In the fifth embodiment of the present photographing lens assembly, the radius of curvature of the object-side surface 541 of the fourth lens element 540 is R7, the radius of curvature of the image-side surface 542 of the fourth lens element 540 is R8, and they satisfy the relation: R7/R8=1.24.

In the fifth embodiment of the present photographing lens assembly, the focal length of the photographing lens assembly is f, the focal length of the first lens element 510 is f1, and they satisfy the relation: f/f1=1.79.

In the fifth embodiment of the present photographing lens assembly, the focal length of the photographing lens assembly is f, the focal length of the third lens element 530 is f3, and they satisfy the relation: (f/f3)*100=−3.04.

In the fifth embodiment of the present photographing lens assembly, the photographing lens assembly further comprises an electronic sensor disposed at the image plane 570 for an object to be imaged thereon. The distance near the optical axis between the object-side surface 511 of the first lens element 510 and the electronic sensor is TTL, half of the diagonal length of the effective pixel area of the electronic sensor is ImgH, and they satisfy the relation: TTL/ImgH=1.78.

The detailed optical data of the fifth embodiment is shown in FIG. 17 (TABLE 9), and the aspheric surface data is shown in FIGS. 18A and 18B (TABLES 10A and 10B), wherein the units of the radius of curvature, the thickness and the focal length are expressed in mm, and HFOV is half of the maximal field of view.

Figure 6A:
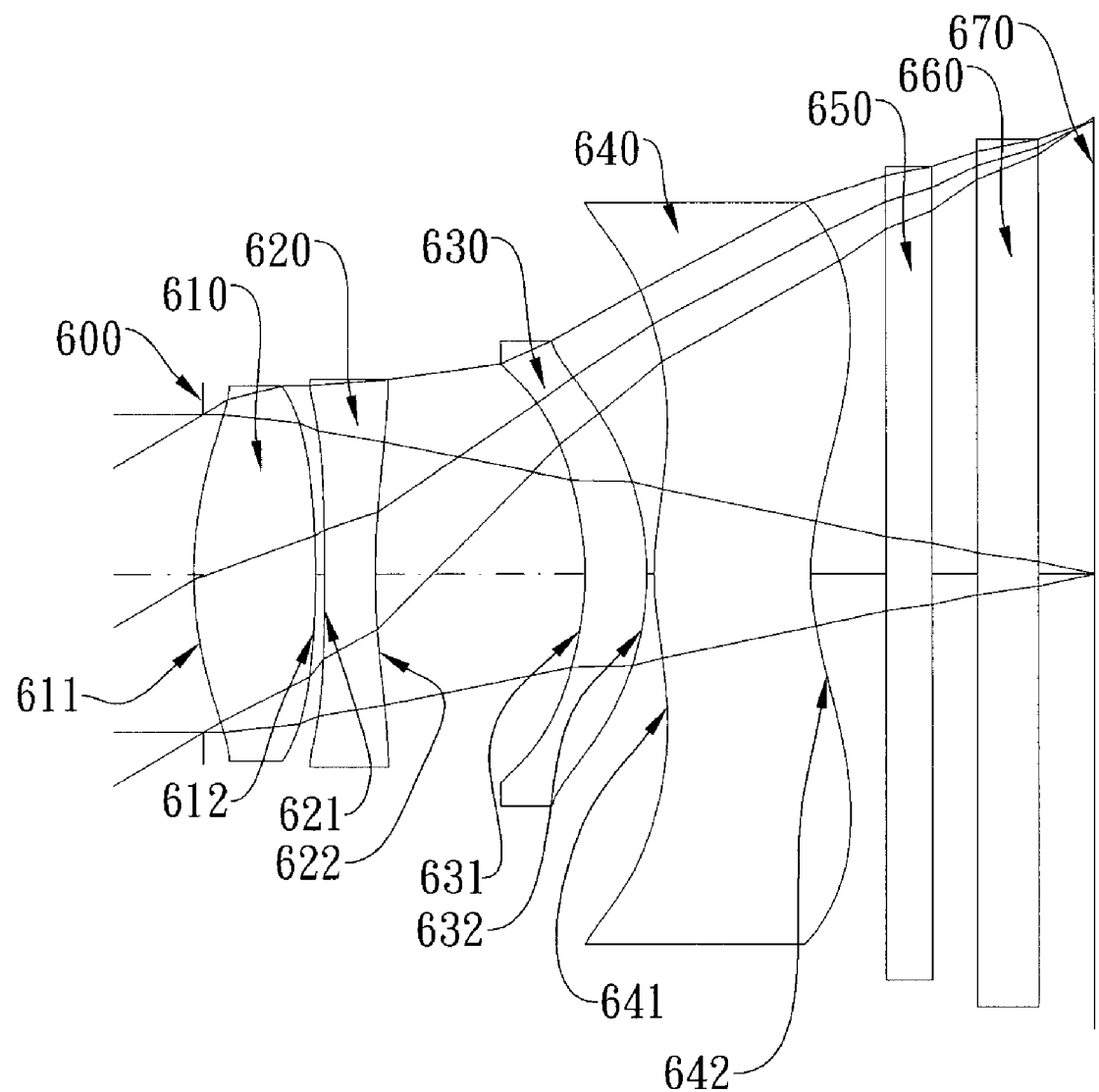
FIG. 6A shows a photographing lens assembly in accordance with a sixth embodiment of the present invention.
Figure 6B:
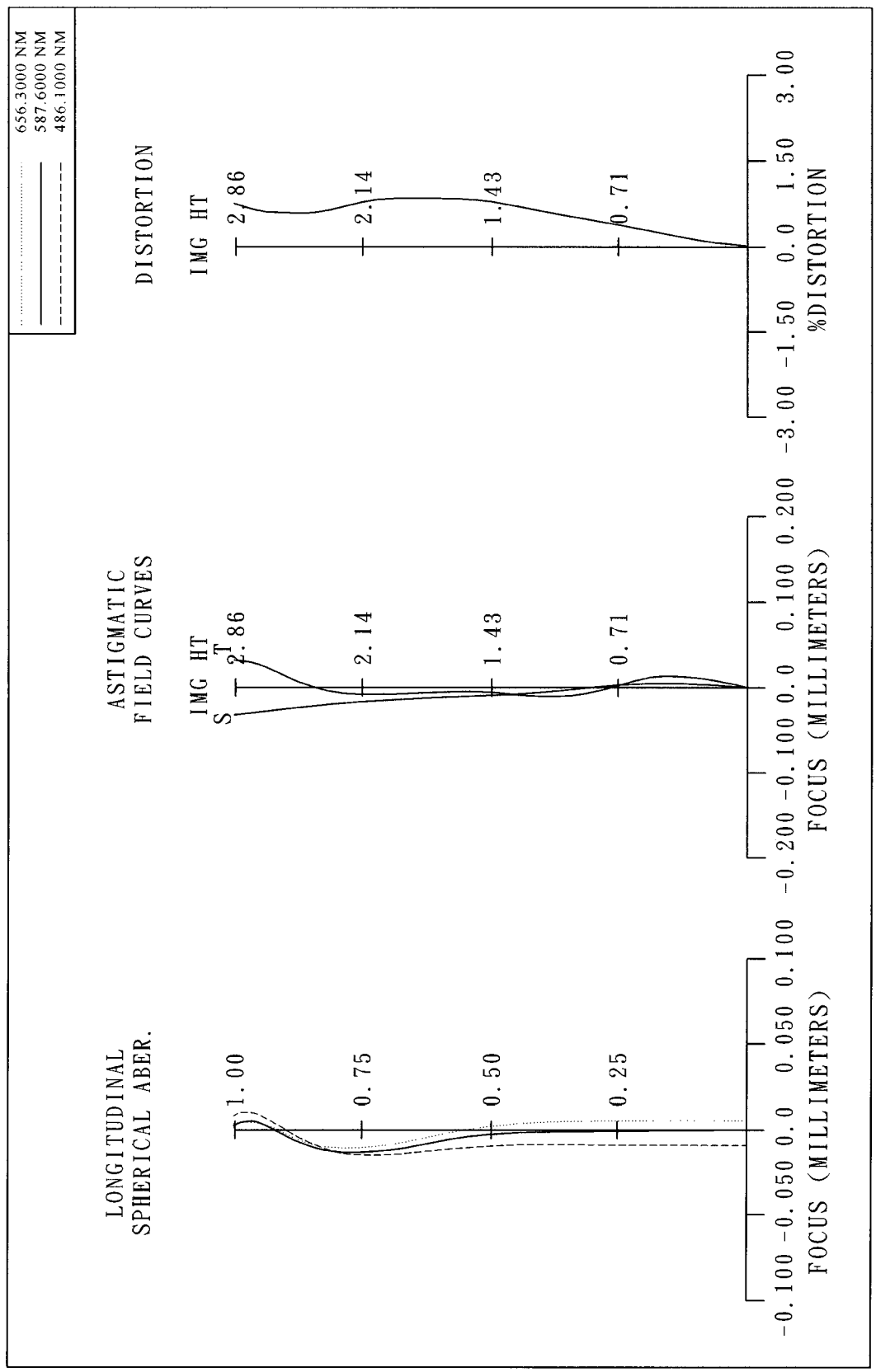
FIG. 6B shows the aberration curves of the sixth embodiment of the present invention.

FIG. 6A shows a photographing lens assembly in accordance with a sixth embodiment of the present invention, and FIG. 6B shows the aberration curves of the sixth embodiment of the present invention. The photographing lens assembly of the sixth embodiment of the present invention mainly comprises four lens elements, in order from the object side to the image side: a plastic first lens element 610 with positive refractive power having a convex object-side surface 611 and a convex image-side surface 612, the object-side and image-side surfaces 611 and 612 thereof being aspheric; a plastic second lens element 620 with negative refractive power having a concave object-side surface 621 and a concave image-side surface 622, the object-side and image-side surfaces 621 and 622 thereof being aspheric; a plastic third lens element 630 with negative refractive power having a concave object-side surface 631 and a convex image-side surface 632, the object-side and image-side surfaces 631 and 632 thereof being aspheric; and a plastic fourth lens element 640 with negative refractive power having a convex object-side surface 641 and a concave image-side surface 642 on which at least one inflection point is formed, the object-side and image-side surfaces 641 and 642 thereof being aspheric; wherein an aperture stop 600 is disposed between an imaged object and the first lens element 610; wherein the photographing lens assembly further comprises an IR filter 650 disposed between the image-side surface 642 of the fourth lens element 640 and an image plane 670 and a cover glass 660 disposed between the IR filter 650 and the image plane 670; and wherein the IR filter 650 and the cover glass 660 are made of glass and have no influence on the focal length of the photographing lens assembly.

The equation of the aspheric surface profiles of the sixth embodiment has the same form as that of the first embodiment.

In the sixth embodiment of the present photographing lens assembly, the focal length of the photographing lens assembly is f, and it satisfies the relation: f=4.94 (mm).

In the sixth embodiment of the present photographing lens assembly, the f-number of the photographing lens assembly is Fno, and it satisfies the relation: Fno=2.45.

In the sixth embodiment of the present photographing lens assembly, half of the maximal field of view of the photographing lens assembly is HFOV, and it satisfies the relation: HFOV=30.0 deg.

In the sixth embodiment of the present photographing lens assembly, the Abbe number of the first lens element 610 is V1, the Abbe number of the second lens element 620 is V2, and they satisfy the relation: V1−V2=32.5.

In the sixth embodiment of the present photographing lens assembly, the Abbe number of the first lens element 610 is V1, the Abbe number of the third lens element 630 is V3, and they satisfy the relation: |V1−V3|=0.0.

In the sixth embodiment of the present photographing lens assembly, the refractive index of the second lens element 620 is N2, and it satisfies the relation: N2=1.632.

In the sixth embodiment of the present photographing lens assembly, the thickness of the second lens element 620 near the optical axis is CT2, and it satisfies the relation: CT2=0.339 (mm).

In the sixth embodiment of the present photographing lens assembly, the distance near the optical axis between the first lens element 610 and the second lens element 620 is T12, the focal length of the photographing lens assembly is f, and they satisfy the relation: (T12/f)*100=1.21.

In the sixth embodiment of the present photographing lens assembly, the distance near the optical axis between the third lens element 630 and the fourth lens element 640 is T34, the thickness of the fourth lens element 640 near the optical axis is CT4, the focal length of the photographing lens assembly is f, and they satisfy the relation: (T34+CT4)/f=0.22.

In the sixth embodiment of the present photographing lens assembly, the radius of curvature of the object-side surface 611 of the first lens element 610 is R1, the focal length of the photographing lens assembly is f, and they satisfy the relation: R1/f=0.49.

In the sixth embodiment of the present photographing lens assembly, the radius of curvature of the image-side surface 622 of the second lens element 620 is R4, the focal length of the photographing lens assembly is f, and they satisfy the relation: R4/f=1.04.

In the sixth embodiment of the present photographing lens assembly, the radius of curvature of the object-side surface 631 of the third lens element 630 is R5, the radius of curvature of the image-side surface 632 of the third lens element 630 is R6, and they satisfy the relation: R5/R6=0.91.

In the sixth embodiment of the present photographing lens assembly, the radius of curvature of the object-side surface 641 of the fourth lens element 640 is R7, the radius of curvature of the image-side surface 642 of the fourth lens element 640 is R8, and they satisfy the relation: R7/R8=1.24.

In the sixth embodiment of the present photographing lens assembly, the focal length of the photographing lens assembly is f, the focal length of the first lens element 610 is f1, and they satisfy the relation: f/f1=1.53.

In the sixth embodiment of the present photographing lens assembly, the focal length of the photographing lens assembly is f, the focal length of the third lens element 630 is f3, and they satisfy the relation: (f/f3)*100=−1.24.

In the sixth embodiment of the present photographing lens assembly, the photographing lens assembly further comprises an electronic sensor disposed at the image plane 670 for an object to be imaged thereon. The distance near the optical axis between the object-side surface 611 of the first lens element 610 and the electronic sensor is TTL, half of the diagonal length of the effective pixel area of the electronic sensor is ImgH, and they satisfy the relation: TTL/ImgH=2.00.

The detailed optical data of the sixth embodiment is shown in FIG. 19 (TABLE 11), and the aspheric surface data is shown in FIG. 20 (TABLE 12), wherein the units of the radius of curvature, the thickness and the focal length are expressed in mm, and HFOV is half of the maximal field of view.

Figure 7A:
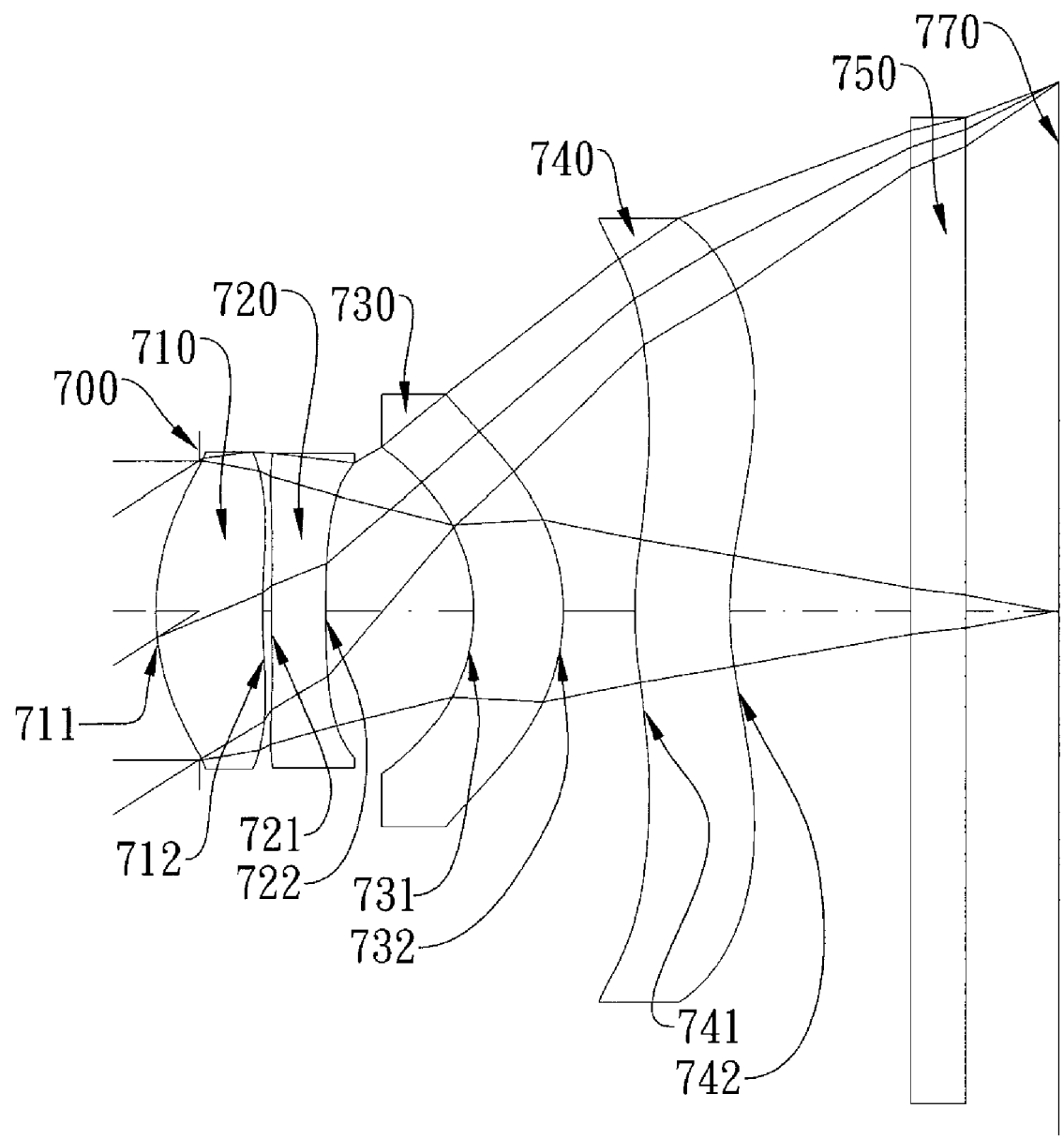
FIG. 7A shows a photographing lens assembly in accordance with a seventh embodiment of the present invention.
Figure 7B:
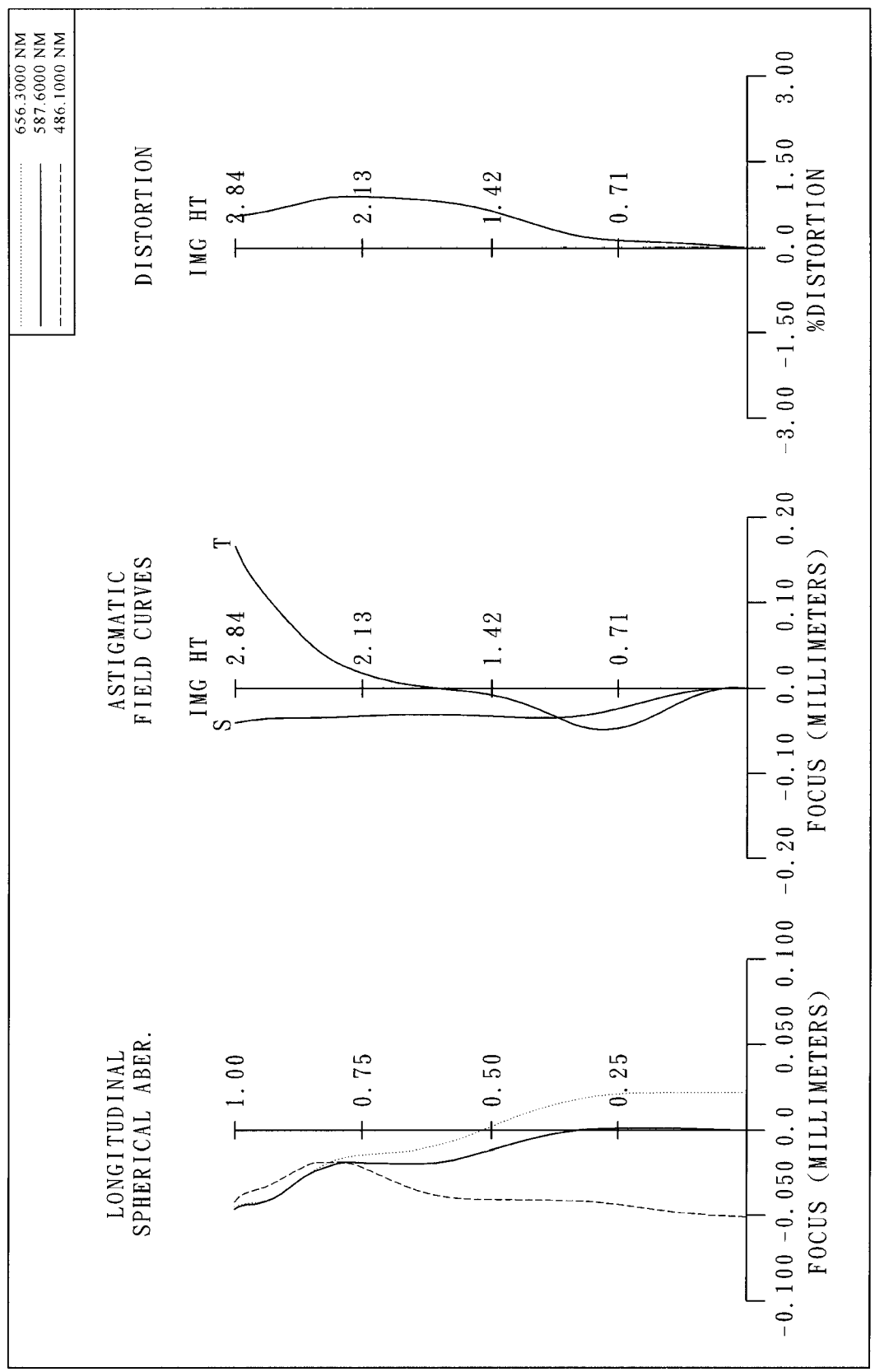
FIG. 7B shows the aberration curves of the seventh embodiment of the present invention.

FIG. 7A shows a photographing lens assembly in accordance with a seventh embodiment of the present invention, and FIG. 7B shows the aberration curves of the seventh embodiment of the present invention. The photographing lens assembly of the seventh embodiment of the present invention mainly comprises four lens elements, in order from the object side to the image side: a plastic first lens element 710 with positive refractive power having a convex object-side surface 711 and a concave image-side surface 712, the object-side and image-side surfaces 711 and 712 thereof being aspheric; a plastic second lens element 720 with negative refractive power having a convex object-side surface 721 and a concave image-side surface 722, the object-side and image-side surfaces 721 and 722 thereof being aspheric; a plastic third lens element 730 with negative refractive power having a concave object-side surface 731 and a convex image-side surface 732, the object-side and image-side surfaces 731 and 732 thereof being aspheric; and a plastic fourth lens element 740 with negative refractive power having a convex object-side surface 741 and a concave image-side surface 742 on which at least one inflection point is formed, the object-side and image-side surfaces 741 and 742 thereof being aspheric; wherein an aperture stop 700 is disposed between an imaged object and the first lens element 710; wherein the photographing lens assembly further comprises an IR filter 750 disposed between the image-side surface 742 of the fourth lens element 740 and an image plane 770; and wherein the IR filter 750 is made of glass and has no influence on the focal length of the photographing lens assembly.

The equation of the aspheric surface profiles of the seventh embodiment has the same form as that of the first embodiment.

In the seventh embodiment of the present photographing lens assembly, the focal length of the photographing lens assembly is f, and it satisfies the relation: f=4.56 (mm).

In the seventh embodiment of the present photographing lens assembly, the f-number of the photographing lens assembly is Fno, and it satisfies the relation: Fno=2.85.

In the seventh embodiment of the present photographing lens assembly, half of the maximal field of view of the photographing lens assembly is HFOV, and it satisfies the relation: HFOV=31.8 deg.

In the seventh embodiment of the present photographing lens assembly, the Abbe number of the first lens element 710 is V1, the Abbe number of the second lens element 720 is V2, and they satisfy the relation: V1−V2=32.5.

In the seventh embodiment of the present photographing lens assembly, the Abbe number of the first lens element 710 is V1, the Abbe number of the third lens element 730 is V3, and they satisfy the relation: |V1−V3|=0.0.

In the seventh embodiment of the present photographing lens assembly, the refractive index of the second lens element 720 is N2, and it satisfies the relation: N2=1.632.

In the seventh embodiment of the present photographing lens assembly, the thickness of the second lens element 720 near the optical axis is CT2, and it satisfies the relation: CT2=0.300 (mm).

In the seventh embodiment of the present photographing lens assembly, the distance near the optical axis between the first lens element 710 and the second lens element 720 is T12, the focal length of the photographing lens assembly is f, and they satisfy the relation: (T12/f)*100=1.10.

In the seventh embodiment of the present photographing lens assembly, the distance near the optical axis between the third lens element 730 and the fourth lens element 740 is T34, the thickness of the fourth lens element 740 near the optical axis is CT4, the focal length of the photographing lens assembly is f, and they satisfy the relation: (T34+CT4)/f=0.20.

In the seventh embodiment of the present photographing lens assembly, the radius of curvature of the object-side surface 711 of the first lens element 710 is R1, the focal length of the photographing lens assembly is f, and they satisfy the relation: R1/f=0.28.

In the seventh embodiment of the present photographing lens assembly, the radius of curvature of the image-side surface 722 of the second lens element 720 is R4, the focal length of the photographing lens assembly is f, and they satisfy the relation: R4/f=1.31.

In the seventh embodiment of the present photographing lens assembly, the radius of curvature of the object-side surface 731 of the third lens element 730 is R5, the radius of curvature of the image-side surface 732 of the third lens element 730 is R6, and they satisfy the relation: R5/R6=0.83.

In the seventh embodiment of the present photographing lens assembly, the radius of curvature of the object-side surface 741 of the fourth lens element 740 is R7, the radius of curvature of the image-side surface 742 of the fourth lens element 740 is R8, and they satisfy the relation: R7/R8=1.23.

In the seventh embodiment of the present photographing lens assembly, the focal length of the photographing lens assembly is f, the focal length of the first lens element 710 is f1, and they satisfy the relation: f/f1=1.30.

In the seventh embodiment of the present photographing lens assembly, the focal length of the photographing lens assembly is f, the focal length of the third lens element 730 is f3, and they satisfy the relation: (f/f3)*100=−5.09.

In the seventh embodiment of the present photographing lens assembly, the photographing lens assembly further comprises an electronic sensor disposed at the image plane 770 for an object to be imaged thereon. The distance near the optical axis between the object-side surface 711 of the first lens element 710 and the electronic sensor is TTL, half of the diagonal length of the effective pixel area of the electronic sensor is ImgH, and they satisfy the relation: TTL/ImgH=1.72.

The detailed optical data of the seventh embodiment is shown in FIG. 21 (TABLE 13), and the aspheric surface data is shown in FIG. 22 (TABLE 14), wherein the units of the radius of curvature, the thickness and the focal length are expressed in mm, and HFOV is half of the maximal field of view.

Figure 8A:
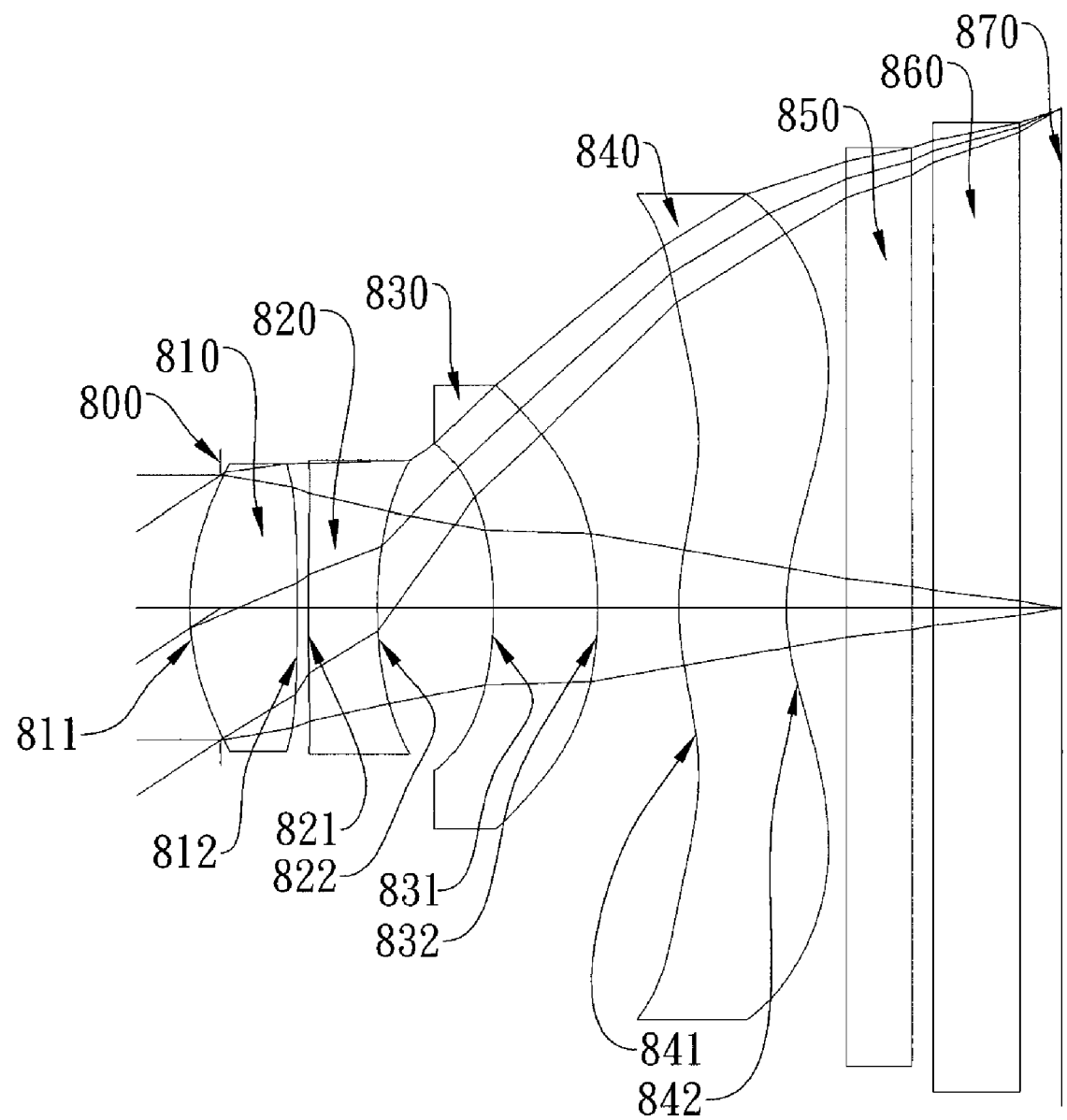
FIG. 8A shows a photographing lens assembly in accordance with an eighth embodiment of the present invention.
Figure 8B:
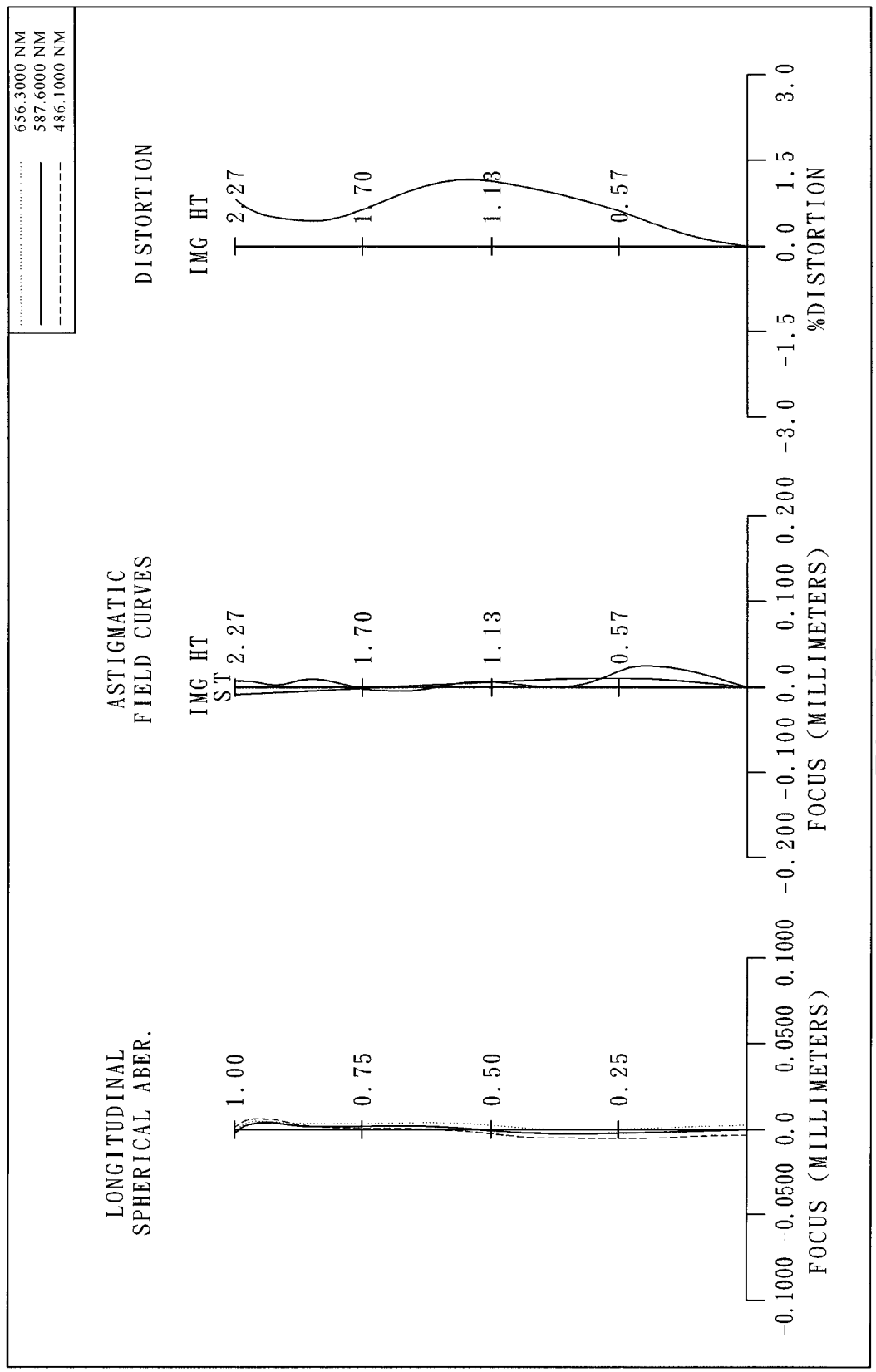
FIG. 8B shows the aberration curves of the eighth embodiment of the present invention.

FIG. 8A shows a photographing lens assembly in accordance with an eighth embodiment of the present invention, and FIG. 8B shows the aberration curves of the eighth embodiment of the present invention. The photographing lens assembly of the eighth embodiment of the present invention mainly comprises four lens elements, in order from the object side to the image side: a plastic first lens element 810 with positive refractive power having a convex object-side surface 811 and a convex image-side surface 812, the object-side and image-side surfaces 811 and 812 thereof being aspheric; a plastic second lens element 820 with negative refractive power having a convex object-side surface 821 and a concave image-side surface 822, the object-side and image-side surfaces 821 and 822 thereof being aspheric; a plastic third lens element 830 with negative refractive power having a concave object-side surface 831 and a convex image-side surface 832, the object-side and image-side surfaces 831 and 832 thereof being aspheric; and a plastic fourth lens element 840 with negative refractive power having a convex object-side surface 841 and a concave image-side surface 842 on which at least one inflection point is formed, the object-side and image-side surfaces 841 and 842 thereof being aspheric; wherein an aperture stop 800 is disposed between an imaged object and the first lens element 810; wherein the photographing lens assembly further comprises an IR filter 850 disposed between the image-side surface 842 of the fourth lens element 840 and an image plane 870 and a cover glass 860 disposed between the IR filter 850 and the image plane 870; and wherein the IR filter 850 and the cover glass 860 are made of glass and have no influence on the focal length of the photographing lens assembly.

The equation of the aspheric surface profiles of the eighth embodiment has the same form as that of the first embodiment.

In the eighth embodiment of the present photographing lens assembly, the focal length of the photographing lens assembly is f, and it satisfies the relation: f=3.44 (mm).

In the eighth embodiment of the present photographing lens assembly, the f-number of the photographing lens assembly is Fno, and it satisfies the relation: Fno=2.85.

In the eighth embodiment of the present photographing lens assembly, half of the maximal field of view of the photographing lens assembly is HFOV, and it satisfies the relation: HFOV=33.3 deg.

In the eighth embodiment of the present photographing lens assembly, the Abbe number of the first lens element 810 is V1, the Abbe number of the second lens element 820 is V2, and they satisfy the relation: V1−V2=32.5.

In the eighth embodiment of the present photographing lens assembly, the Abbe number of the first lens element 810 is V1, the Abbe number of the third lens element 830 is V3, and they satisfy the relation: |V1−V3|=0.0.

In the eighth embodiment of the present photographing lens assembly, the refractive index of the second lens element 820 is N2, and it satisfies the relation: N2=1.632.

In the eighth embodiment of the present photographing lens assembly, the thickness of the second lens element 820 near the optical axis is CT2, and it satisfies the relation: CT2=0.318 (mm).

In the eighth embodiment of the present photographing lens assembly, the distance near the optical axis between the first lens element 810 and the second lens element 820 is T12, the focal length of the photographing lens assembly is f, and they satisfy the relation: (T12/f)*100=1.45.

In the eighth embodiment of the present photographing lens assembly, the distance near the optical axis between the third lens element 830 and the fourth lens element 840 is T34, the thickness of the fourth lens element 840 near the optical axis is CT4, the focal length of the photographing lens assembly is f, and they satisfy the relation: (T34+CT4)/f=0.25.

In the eighth embodiment of the present photographing lens assembly, the radius of curvature of the object-side surface 811 of the first lens element 810 is R1, the focal length of the photographing lens assembly is f, and they satisfy the relation: R1/f=0.35.

In the eighth embodiment of the present photographing lens assembly, the radius of curvature of the image-side surface 822 of the second lens element 820 is R4, the focal length of the photographing lens assembly is f, and they satisfy the relation: R4/f=0.53.

In the eighth embodiment of the present photographing lens assembly, the radius of curvature of the object-side surface 831 of the third lens element 830 is R5, the radius of curvature of the image-side surface 832 of the third lens element 830 is R6, and they satisfy the relation: R5/R6=0.91.

In the eighth embodiment of the present photographing lens assembly, the radius of curvature of the object-side surface 841 of the fourth lens element 840 is R7, the radius of curvature of the image-side surface 842 of the fourth lens element 840 is R8, and they satisfy the relation: R7/R8=1.20.

In the eighth embodiment of the present photographing lens assembly, the focal length of the photographing lens assembly is f, the focal length of the first lens element 810 is f1, and they satisfy the relation: f/f1=1.72.

In the eighth embodiment of the present photographing lens assembly, the focal length of the photographing lens assembly is f, the focal length of the third lens element 830 is f3, and they satisfy the relation: (f/f3)*100=−1.23.

In the eighth embodiment of the present photographing lens assembly, the photographing lens assembly further comprises an electronic sensor disposed at the image plane 870 for an object to be imaged thereon. The distance near the optical axis between the object-side surface 811 of the first lens element 810 and the electronic sensor is TTL, half of the diagonal length of the effective pixel area of the electronic sensor is ImgH, and they satisfy the relation: TTL/ImgH=1.67.

The detailed optical data of the eighth embodiment is shown in FIG. 23 (TABLE 15), and the aspheric surface data is shown in FIGS. 24A and 24B (TABLES 16A and 16B), wherein the units of the radius of curvature, the thickness and the focal length are expressed in mm, and HFOV is half of the maximal field of view.

It is to be noted that TABLES 1-16 (illustrated in FIGS. 9-24 respectively) show different data of the different embodiments, however, the data of the different embodiments are obtained from experiments. Therefore, any photographing lens assembly of the same structure is considered to be within the scope of the present invention even if it uses different data. The embodiments depicted above and the appended drawings are exemplary and are not intended to limit the claim scope of the present invention. TABLE 17 (illustrated in FIG. 25) shows the data of the respective embodiments resulting from the equations.

What is claimed is:

1. A photographing lens assembly comprising, in order from an object side to an image side:
    a first lens element with positive refractive power having a convex object-side surface and a convex image-side surface;
    a second lens element with negative refractive power having a concave object-side surface and a concave image-side surface;
    a third lens element with negative refractive power, the object-side and image-side surfaces thereof being aspheric;
    a fourth lens element with negative refractive power having a concave image-side surface on which at least one inflection point is formed; and
    an aperture stop disposed between an imaged object and the second lens element; wherein there are four lens elements with refractive power; and wherein a distance near the optical axis between the first and second lens elements is T12, a focal length of the photographing lens assembly is f, an Abbe number of the first lens element is V1, an Abbe number of the second lens element is V2, a focal length of the third lens element is f3, and they satisfy the relations: 0.50<(T12/f)*100<10.00, 30.5<V1−V2<42.0, −60.0<(f/f3)*100<−0.5.

2. The photographing lens assembly according to claim 1, wherein the object-side surface of the third lens element is concave, and the fourth lens element is made of plastic material.

3. The photographing lens assembly according to claim 2, wherein the focal length of the photographing lens assembly is f, a focal length of the first lens element is f1, and they satisfy the relation: 1.30<f/f1<2.00.

4. The photographing lens assembly according to claim 3, wherein the focal length of the photographing lens assembly is f, the focal length of the first lens element is f1, and they satisfy the relation: 1.45<f/f1<1.80.

5. The photographing lens assembly according to claim 2, wherein the focal length of the photographing lens assembly is f, the focal length of the third lens element is f3, and they satisfy the relation: −20.0<(f/f3)*100<−0.5.

6. The photographing lens assembly according to claim 2, wherein a radius of curvature of the object-side surface of the first lens element is R1, the focal length of the photographing lens assembly is f, and they satisfy the relation: 0.33<R1/f<0.50.

7. The photographing lens assembly according to claim 2, wherein the distance near the optical axis between the first and second lens elements is T12, the focal length of the photographing lens assembly is f, and they satisfy the relation: 0.50<(T12/f)*100<3.00.

8. The photographing lens assembly according to claim 7, wherein the distance near the optical axis between the first and second lens elements is T12, the focal length of the photographing lens assembly is f, and they satisfy the relation: 0.50<(T12/f)*100<1.45.

9. The photographing lens assembly according to claim 2, wherein a thickness of the second lens element near the optical axis is CT2, and it satisfies the relation: 0.10 (mm) <CT2<0.34 (mm).

10. The photographing lens assembly according to claim 2, wherein the aperture stop is disposed between an imaged object and the first lens element.

11. The photographing lens assembly according to claim 2, wherein a radius of curvature of the object-side surface of the third lens element is R5, a radius of curvature of the image-side surface of the third lens element is R6, a radius of curvature of the object-side surface of the fourth lens element is R7, a radius of curvature of the image-side surface of the fourth lens element is R8, and they satisfy the relations: 0.60<R5/R6<1.50, 0.60<R7/R8<1.50.

12. The photographing lens assembly according to claim 1, wherein a radius of curvature of the image-side surface of the second lens element is R4, the focal length of the photographing lens assembly is f, and they satisfy the relation: 1.00<R4/f<3.00.

13. The photographing lens assembly according to claim 1, wherein a distance near the optical axis between the third and fourth lens elements is T34, a thickness of the fourth lens element near the optical axis is CT4, the focal length of the photographing lens assembly is f, and they satisfy the relation: $0.05<(T34+CT4)/f<0.25$.

14. The photographing lens assembly according to claim 1 further comprising an electronic sensor on which an object is imaged, wherein a distance near the optical axis between the object-side surface of the first lens element and the electronic sensor is TTL, half of the diagonal length of the effective pixel area of the electronic sensor is ImgH, and they satisfy the relation: $TTL/ImgH<2.05$.

15. A photographing lens assembly comprising, in order from an object side to an image side:
   a first lens element with positive refractive power having a convex object-side surface;
   a second lens element with negative refractive power;
   a third lens element with negative refractive power having a concave object-side surface and a convex image-side surface, the object-side and image-side surfaces thereof being aspheric;
   a fourth lens element with negative refractive power having a concave image-side surface on which at least one inflection point is formed; and
   an aperture stop disposed between an imaged object and the second lens element; wherein a distance near the optical axis between the first and second lens elements is T12, a focal length of the photographing lens assembly is f, an Abbe number of the first lens element is V1, an Abbe number of the third lens element is V3, a refractive index of the second lens element is N2, a distance near the optical axis between the third and fourth lens elements is T34, a thickness of the fourth lens element near the optical axis is CT4, and they satisfy the relations: $0.50<(T12/f)*100<10.00$, $|V1-V3|<15.0$, $1.50<N2<1.66$, $0.05<(T34+CT4)/f<0.25$.

16. The photographing lens assembly according to claim 15, wherein the second lens element has a concave image-side surface, wherein the object-side and image-side surfaces of the fourth lens element are aspheric, and wherein there are four lens elements with refractive power.

17. The photographing lens assembly according to claim 16, wherein the second lens element has a concave object-side surface.

18. The photographing lens assembly according to claim 16, wherein the focal length of the photographing lens assembly is f, a focal length of the first lens element is f1, and they satisfy the relation: $1.30<f/f1<2.00$.

19. The photographing lens assembly according to claim 18, wherein the focal length of the photographing lens assembly is f, the focal length of the first lens element is f1, and they satisfy the relation: $1.45<f/f1<1.80$.

20. The photographing lens assembly according to claim 16, wherein the Abbe number of the first lens element is V1, an Abbe number of the second lens element is V2, and they satisfy the relation: $30.5<V1-V2<42.0$.

21. The photographing lens assembly according to claim 16, wherein the focal length of the photographing lens assembly is f, a focal length of the third lens element is f3, and they satisfy the relation: $-20.0<(f/f3)*100<-0.5$.

22. The photographing lens assembly according to claim 21, wherein a radius of curvature of the object-side surface of the third lens element is R5, a radius of curvature of the image-side surface of the third lens element is R6, a radius of curvature of the object-side surface of the fourth lens element is R7, a radius of curvature of the image-side surface of the fourth lens element is R8, and they satisfy the relations: $0.60<R5/R6<1.50$, $0.60<R7/R8<1.50$.

23. The photographing lens assembly according to claim 16, wherein the aperture stop is disposed between an imaged object and the first lens element.

24. The photographing lens assembly according to claim 15, wherein a distance near the optical axis between the first and second lens elements is T12, the focal length of the photographing lens assembly is f, and they satisfy the relation: $0.50<(T12/f)*100<1.45$.

25. The photographing lens assembly according to claim 15, wherein a radius of curvature of the image-side surface of the second lens element is R4, the focal length of the photographing lens assembly is f, and they satisfy the relation: $1.00<R4/f<3.00$.

26. The photographing lens assembly according to claim 15 further comprising an electronic sensor on which an object is imaged, wherein a distance near the optical axis between the object-side surface of the first lens element and the electronic sensor is TTL, half of the diagonal length of the effective pixel area of the electronic sensor is ImgH, and they satisfy the relation: $TTL/ImgH<2.05$.

* * * * *